(12) United States Patent
Neil

(10) Patent No.: US 11,340,436 B2
(45) Date of Patent: May 24, 2022

(54) OBJECTIVE LENSES HAVING MULTIPLE FOCAL LENGTHS AND A SMALL FOCAL-LENGTH RATIO

(71) Applicant: Iain A. Neil, Canobbio (CH)

(72) Inventor: Iain A. Neil, Canobbio (CH)

(*) Notice: Subject to any disclaimer, the term of this patent is extended or adjusted under 35 U.S.C. 154(b) by 0 days.

(21) Appl. No.: 15/733,488

(22) PCT Filed: Feb. 8, 2019

(86) PCT No.: PCT/US2019/017224
§ 371 (c)(1),
(2) Date: Aug. 10, 2020

(87) PCT Pub. No.: WO2019/157289
PCT Pub. Date: Aug. 15, 2019

(65) Prior Publication Data
US 2020/0371327 A1    Nov. 26, 2020

Related U.S. Application Data

(60) Provisional application No. 62/629,554, filed on Feb. 12, 2018.

(51) Int. Cl.
*G02B 15/14* (2006.01)
*G02B 15/177* (2006.01)
*G02B 15/04* (2006.01)

(52) U.S. Cl.
CPC .......... *G02B 15/177* (2013.01); *G02B 15/04* (2013.01); *G02B 15/143507* (2019.08)

(58) Field of Classification Search
None
See application file for complete search history.

(56) References Cited

U.S. PATENT DOCUMENTS

| | | |
|---|---|---|
| 2,454,686 A | 11/1948 | Back |
| 2,718,150 A | 9/1955 | Elliott |

(Continued)

OTHER PUBLICATIONS

PCT International Search Report and Written Opinion dated Aug. 7, 2019 in International Patent Application No. PCT/US2019/017224.

(Continued)

*Primary Examiner* — Darryl J Collins
(74) *Attorney, Agent, or Firm* — Downs Rachlin Martin PLLC

(57) ABSTRACT

The objective lens has multiple focal lengths within a focal length interval and a relatively small focal-length ratio in a range from 1.05 to 2.75, and a travel-to-focal-length ratio in a range from 0.05 to 0.4. The objective lens has three main lens groups that define a negative-positive-positive optical system configuration. The first lens group has a rearward lens sub-group that is axially movable for focusing so that the lens length stays the same during focusing. The objective lenses use optical compensation rather than mechanical compensation to move between the design focal lengths each having an in-focus image. This simplifies operation while increasing reliability and reducing cost. A small set of one or more of the objective lenses can be used to replace a large set of prime lenses each having a single focal length, so that fewer lenses are needed to cover the same focal length span.

9 Claims, 14 Drawing Sheets

(56) References Cited

U.S. PATENT DOCUMENTS

| | | | |
|---|---|---|---|
| 2,718,817 A | 9/1955 | Back et al. | |
| 2,778,272 A | 9/1955 | Lucien | |
| 2,782,684 A | 2/1957 | Horace | |
| 3,051,052 A | 8/1962 | Leonard | |
| 3,294,471 A | 12/1966 | Back | |
| 3,848,967 A | 11/1974 | Grey | |
| 4,232,942 A | 11/1980 | Ikemori | |
| 4,632,498 A | 12/1986 | Neil | |
| 7,123,421 B1 | 10/2006 | Moskovich et al. | |
| 2009/0195884 A1* | 8/2009 | Inoko | G02B 15/145531 359/682 |
| 2011/0304921 A1 | 12/2011 | Nagahara | |
| 2013/0250160 A1* | 9/2013 | Neil | G02B 15/144515 348/345 |
| 2016/0291301 A1* | 10/2016 | Nagatoshi | G02B 15/1465 |
| 2020/0341250 A1* | 10/2020 | Mochizuki | G02B 15/177 |

OTHER PUBLICATIONS

Neil, Iain, "A Modern Series of Cinematographic Lenses: From Concept to Product." SPIE vol. 892 Simulation and Modeling of Optical Systems (1988), pp. 165-172.

Bergstein Leonard et al., "Four-Component Optically Compensated Varifocal System." Journal of the Optical Society of America, vol. 52, No. 4, Apr. 1962, pp. 376-388.

Bergstein, Leonard et al., "Three-Component Optically Compensated Varifocal System." Journal of the Optical Society of America, vol. 52, No. 4, Apr. 1962, pp. 363-375.

Bergstein, Leonard et al., "Two-Component Optically Compensated Varifocal System." Journal of the Optical Society of America, vol. 52, No. 4, Apr. 1962, pp. 353-362.

Bergstein, Leonard, "General Theory of Optically Compensated Varifocal Systems." Journal of the Optical Society of America, vol. 48, No. 3, Mar. 1958, pp. 154-171.

Bergstein, Leonard et al., "Third-Order Aberration Theory for Varifocal Systems." Journal of the Optical Society of America, vol. 47, No. 7, Jul. 1957, pp. 579-583.

Back, F.G. et al., "The Basic Theory of Varifocal Lenses with Linear Movement and Optical Compensation", vol. 44, No. 9, Sep. 1954, pp. 684-691.

Matter, G.H. et al., "A Family of Optically Compensated Zoom Lenses." vol. 9, No. 4, Apr. 1970, pp. 844-848.

Kichima, Mutsuhito et al. "M-Hexanon Dual Lens." vol. 16, 2003, pp. 43-46 (Dec. 3, 2017).

"LEICA TRI-ELMAR-M 16-18-21 mm f/4 ASPH." pp. 1-16 (Dec. 2, 2017).

"LEICA TRI-ELMAR-M 28-35-50 mm F/4 ASPH." pp. 1-16 (Dec. 2, 2017).

* cited by examiner

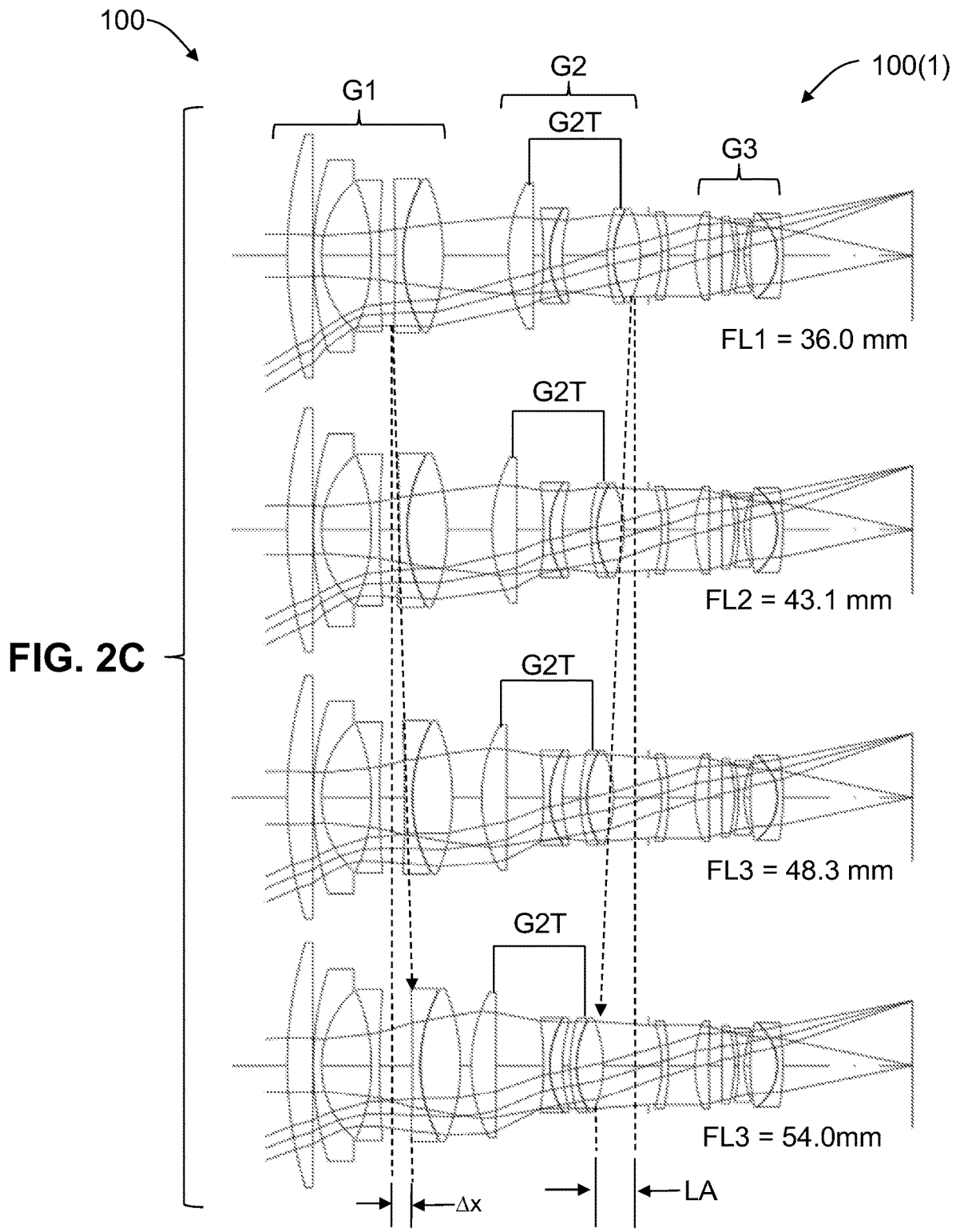

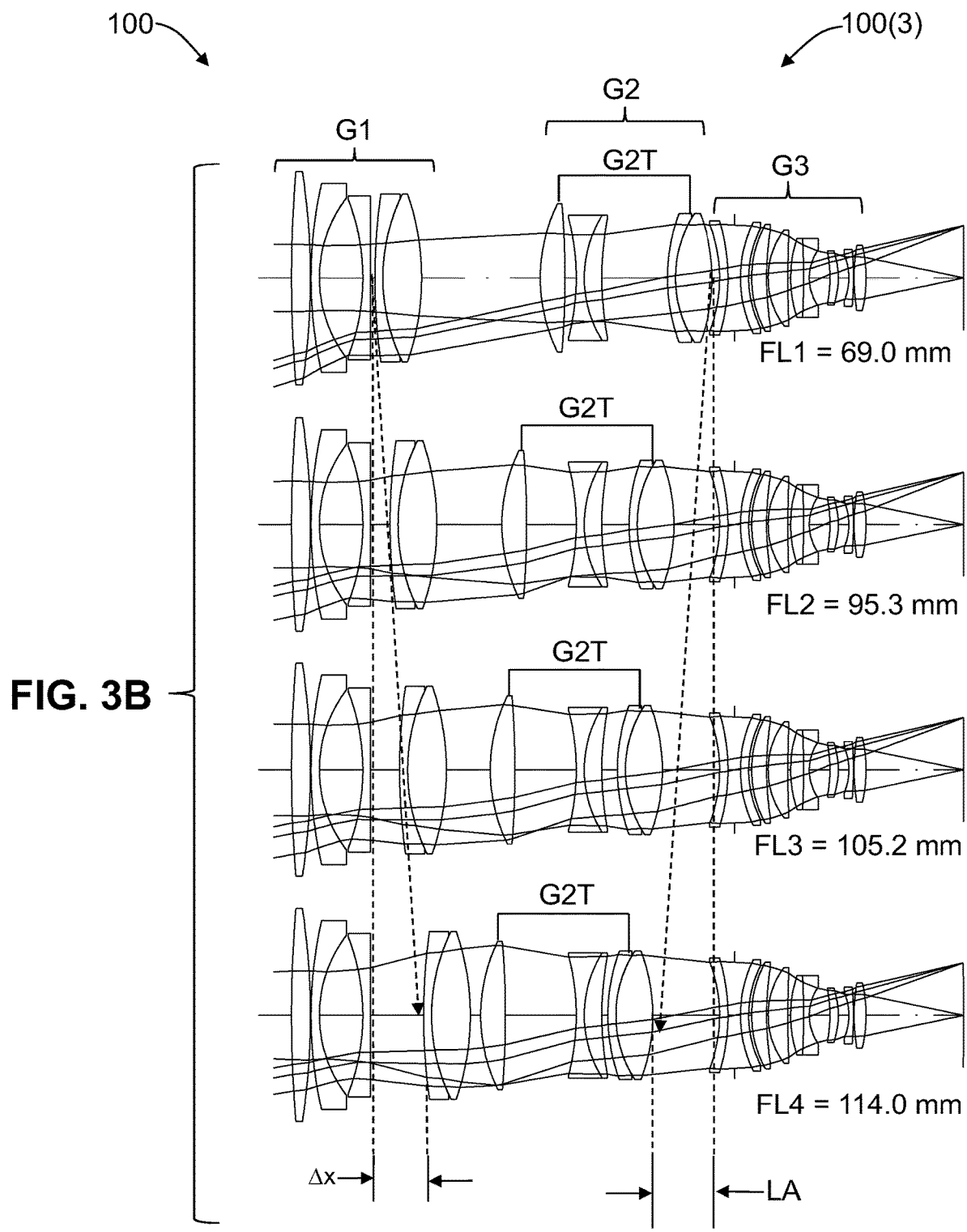

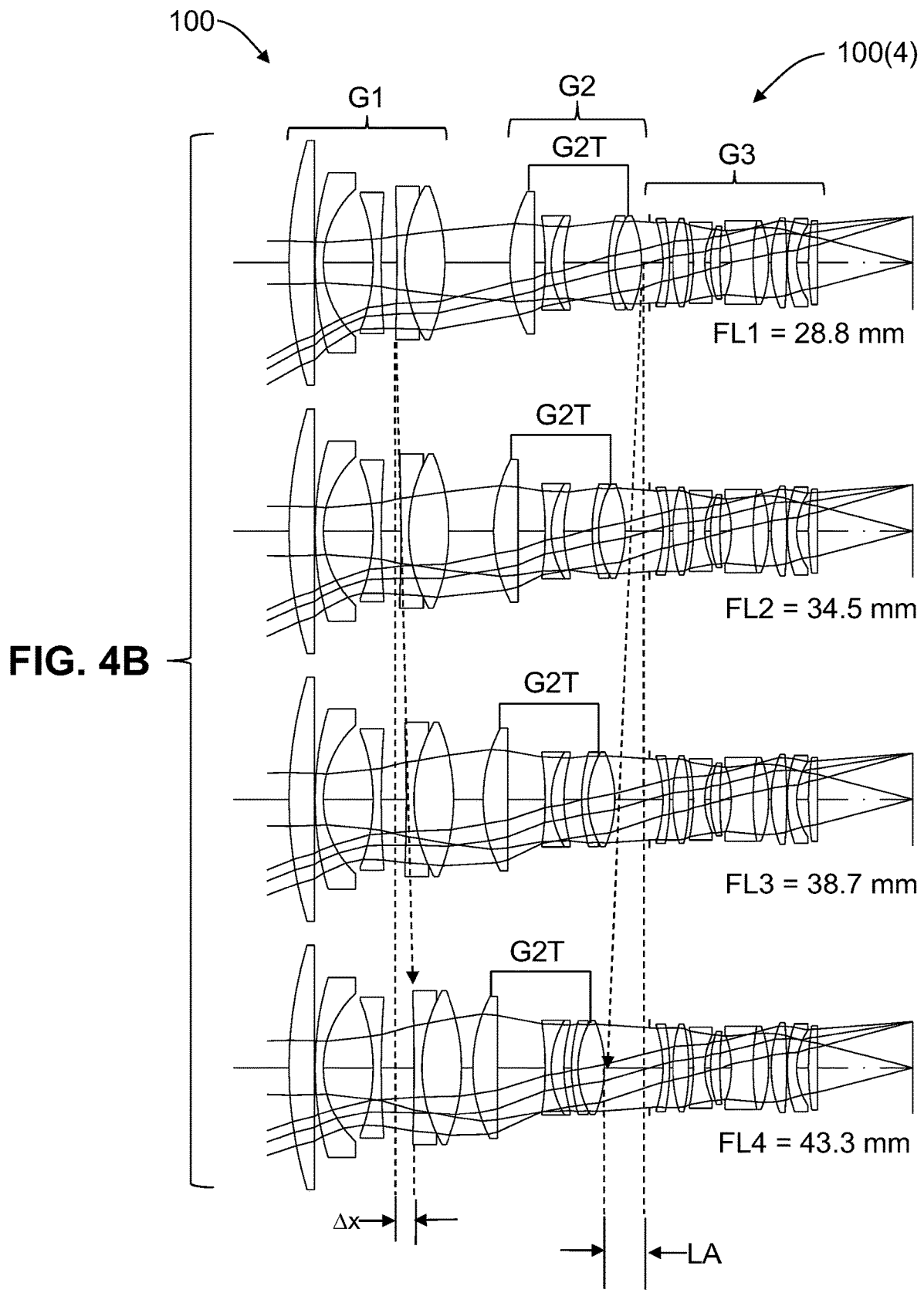

OBJECTIVE LENSES HAVING MULTIPLE FOCAL LENGTHS AND A SMALL FOCAL-LENGTH RATIO

CROSS-REFERENCE TO RELATED APPLICATIONS

This Application claims priority under 35 U.S.C. § 119(e) of U.S. Provisional Application Ser. No. 62/629,554, filed on Feb. 12, 2018, which is incorporated by reference herein, and also claims priority from PCT International Patent Application Number PCT/US2019/017224, with an international filing date of Feb. 8, 2019, which is also incorporated by reference herein.

FIELD

The disclosure relates to objective lenses, and in particular to objective lenses having multiple focal lengths and small focal-length ratio.

BACKGROUND ART

The field of cinematography generally involves performing motion-picture photography ("filming") by recording images of different scenes using a cinemagraphic camera that has either film or a digital image sensor. To achieve desired artistic effects using close-up shots, wide-angle shots, defocused shots, etc., the cinemagraphic camera is adapted to accommodate a variety of objective lenses having respective focal lengths. Cinemagraphic objective lenses having a single focal length are referred to in the art as "prime lenses."

For example, for wide-angle shots, the cinemagraphic camera may be fitted with a prime lens having a relatively short focal length (e.g., 25 mm). Likewise, for close-up ("telephoto") shots, the cinemagraphic camera may be fitted with a prime lens having a relatively long focal length (e.g., 150 mm). Other prime lenses have intermediate focal lengths between the wide-angle and telephoto limits are used to round out the set of prime lenses used in making the movie. In commercial movie production, a cinematographer may require as many as ten different prime lenses to provide the necessary artistic rendering for the various scenes in the movie.

The advent of high-resolution electronic (digital) sensors over the last ten years or so has caused a mass migration from film (analog) image capture to electronic (digital) image capture. This has substantially reduced the overall cost of cinemagraphic cameras by factors of about 2× to 3×, and in some cases substantially more. At the same time, the cost of high-performance objective lenses for cinemagraphic cameras has hardly changed because there has been no significant change in the lens technology.

The cost of a series of prime lenses covering a focal length range of, for example, about 25 mm to 110 mm, depends on the total cost of perhaps eight lenses of different focal length spanning the focal length range. Contemporary high performance prime lenses that provide a similar and consistent high level of image quality such as modulation transfer function (MTF) usually are high cost (e.g., $15K to $25K), while the total lens cost for a series of different focal length prime lenses can exceed the camera cost.

Not all cinemagraphic lenses are prime lenses. Some cinemagraphic objective lenses are configured as zoom lenses, which provide multiple focal lengths by selectively moving one or more of the lens elements. Such lenses provide the flexibility associated with not having to switch out prime lenses, especially in certain types of situations where the scene may not be entirely controlled (e.g., filming documentaries). Likewise, certain filming effects, such as slam zooming and the dolly zoom require the use of a zoom lens.

Since digital cameras have become substantially smaller in both size and weight, these same features are preferred for the prime lenses to permit practical handheld use of the camera and lens combination. Due to increased complexity, including the total number of lens elements required, the cost of a high-performance zoom lens is significantly greater than that of a high-performance prime lens. Likewise, zoom lenses tend to be much longer and weigh more than their prime lens counterparts. In addition, the image quality (i.e., modulation transfer function or MTF) for a zoom lens can vary substantially throughout the focal length range. Other disadvantages of contemporary zoom lenses depend on the particular type of zoom lens.

One type of zoom lens is referred to in the art as a mechanically compensated zoom lens. A mechanically compensated zoom lens utilizes at least two axially movable zoom lens groups that move with different loci to provide zooming while keeping the image in focus. For sufficient control of the relative positions of the two zoom lens groups and the other lens groups of a mechanically compensated zoom lens, a precision mechanism, including a mechanical cam, may be required. Thus, mechanically compensated zoom lenses tend to be relatively large and heavy.

Another type of zoom lens is referred to in the art as an optically compensated zoom lens. An optically compensated zoom lens utilizes one or more lens groups that move together with the same loci, i.e., in the same direction and the same distance. A varifocal optically compensated zoom lens requires re-focusing (usually by a front-focusing lens group) when changing the focal length, and in such lenses the image quality (e.g., MTF) is reduced through parts of the focal length range. In addition, in an optically compensated zoom lens, the powers of axially movable zoom lens groups are usually constrained to values that tend to adversely affect the size, weight, complexity and cost of the front focusing lens group. Another adverse effect of this constraint is to adversely affect the focus breathing capacity of the focusing lens group. The focus breathing is the change in the field of view from one focus distance to another at any one focal length. In particular, the focus breathing capacity is not as small as that of a prime lens.

Consequently, even though present-day zoom lenses provide multiple focal lengths in a single lens, the above-described issues with zoom lenses have led cinematographers to still heavily rely on prime lenses when making movies and high-end videos. This is done with the understanding by the end users in the cinematography industry that the cost of a collection of prime lenses will remain inordinately high and substantially unchanged even as other aspects of camera technology improve and become less expensive.

SUMMARY OF THE INVENTION

The objective lenses disclosed herein have multiple focal lengths within a focal length interval and a relatively small focal-length ratio in a range from 1.05 to 2.75, and a travel-to-focal-length ratio (defined below) in a range from 0.05 to 0.4. The objective lens has three main lens groups that define a negative-positive-positive optical system power configuration. The first lens group has a rearward lens sub-group that is axially movable for focusing so that the lens length stays the same during focusing. The objective lenses use optical compensation rather than mechanical compensation to move between the design focal lengths each having an in-focus image. This simplifies operation while increasing reliability and reducing cost. A small set of one or more of the objective lenses can be used to replace a large set of prime lenses each having a single focal length, so that fewer lenses are needed to cover the same focal length span.

Aspects of the disclosure are directed to optically compensated objective lenses having a relatively small focal-length ratio FLR (e.g., 1.05≤FLR≤2.75) and that provide multiple focal lengths while maintaining preferred prime lens characteristics, such as compactness, low weight and consistent high performance image quality, at a relatively low cost, e.g., about that of a single prime lens.

Aspects of the disclosure are also directed to a collection or set of optically compensated objective lenses each having multiple design focal lengths, with the objective lenses in the set configured to cover a select overall span of focal lengths, e.g., from wide-angle to telephoto. To this end, a set of compact and lightweight prime lenses each having one focal length can be replaced by a smaller set (i.e., a reduced number) of the objective lenses as disclosed herein that are similarly compact, lightweight and relatively low cost, with each objective lens providing at least some of the multiple focal lengths that were provided by the prime lenses. The overall focal length span of the set of objective lenses can be made to provide suitable coverage for the given application by each objective lens providing operation at multiple focal lengths by moving to the different focal lengths, but without necessarily providing for adequate image quality at all points between the designed focal lengths since the intermediate focal lengths (i.e., the focal lengths other than the design focal lengths) are not specifically intended to be used but could optionally be used. Thus, while the objective lens has zooming functionality, the zooming is merely a way to change the focal length between the design focal lengths.

In one example, the focal length intervals of the objective lenses in a set of objective lenses do not overlap, i.e., are non-overlapping. In another example, the focal length intervals can partially overlap but still have different design focal lengths. For example, a first objective lens in the set can have design focal lengths of 22 mm and 30 mm while a second objective lens in the set can have design focal lengths of 28 mm and 34 mm and 44 mm. In yet another example, the focal length intervals can partially overlap and have one design focal length in common. For most cinemagraphic and high-end video applications, it will be desirable to have non-overlapping focal length intervals by judicious selection of the objective lenses when putting together the set of objective lenses for a given application. Having partially overlapping focal length intervals for objective lenses in a set of objective lenses may arise due to practicality in that for a variety of reasons one might be limited in the selection of available objective lenses when putting together a set of objective lenses.

An embodiment of the disclosure is an objective lens comprising along an optical axis and in order from an object space defining a frontward direction to an image space defining a rearward direction and having an image surface: a first lens group having overall negative (−) power and having a frontward first lens sub-group with overall negative (−) power and that is stationary, and a rearward second lens sub-group with overall positive (+) power and that is axially movable for focusing; a second lens group having overall positive (+) power; a third lens group having overall positive (+) power; an aperture stop residing either between the second and third lens groups or within the third lens group; between two and four design focal lengths (i.e., two, three or four focal lengths) that include a minimum design focal length $FL_{MIN}$ and a maximum design focal length $FL_{MAX}$ that define a focal-length ratio $LC=FL_{MAX}/FL_{MIN}$, wherein 1.05<FLR≤2.75; and wherein the second lens group has one or more axially and in-tandem movable lens elements to change between the design focal lengths and that define a travel-to-focal-length (TFL) ratio R in the range 0.05<R<0.35.

Another embodiment of the disclosure is an objective lens comprising along an optical axis and in order from an object space defining a front and frontward direction to an image space defining a rearward direction and having an image surface: a first lens group having overall negative (−) power and having a frontward first lens sub-group with overall negative (−) power and that is stationary, and a rearward second lens sub-group with overall positive (+) power that is axially movable for focusing; a second lens group having overall positive (+) power and comprising first and second positive (+) power lens sub-groups with respective first and second focal lengths, with the shorter of the first and second focal lengths being a short focal length $f_s$; a third lens group having overall positive (+) power; an aperture stop residing either between the second and third lens groups or within the third lens group; between two and four design focal lengths (i.e., two, three or four focal lengths) that include a minimum design focal length $FL_{MIN}$ and a maximum design focal length $FL_{MAX}$ that define a focal-length ratio $FLR=FL_{MAX}/FL_{MIN}$, wherein 1.05<FLR≤2.75; and wherein the first and second (+) power lens sub-groups of the second lens group are axially movable in tandem over an axial distance LA between the minimum design focal length $FL_{MIN}$ and the maximum design focal length $FL_{MAX}$, and wherein the short focal length $f_s$ and the axial distance LA define a TFL ratio R=0.05≤LA/$f_s$≤0.4.

Another embodiment of the disclosure is an objective lens comprising along an optical axis and in order from an object space defining a front and a frontward direction to an image space defining a rearward direction and having an image surface: a first lens group having overall negative (−) power and having a frontward first lens sub-group with overall negative (−) power and that is stationary, and a rearward second lens sub-group with overall positive (+) power that is axially movable for focusing; a second lens group having overall positive (+) power and a focal length $f_s$; a third lens group having overall positive (+) power; an aperture stop located between the second and third lens groups; first and second design focal lengths FL1 and FL2 only, wherein FL2>FL1 and wherein the first and second design focal lengths FL1 and FL2 define a focal-length ratio FLR=FL2/FL1, wherein 1.05<FLR≤2.75; and wherein the second lens group is movable over an axial distance LA between the first and second design focal lengths, and wherein the focal length $f_s$ and the axial distance LA define a travel-to-focal-length (TFL) ratio R=0.05<LA/$f_s$<0.40.

Another embodiment of the disclosure is directed to a set of the objective lenses as disclosed herein, with each objective lens having a focal length interval, and wherein the focal length intervals of the plurality of the objective lenses are different from each other. In an example, the focal length intervals of the plurality of objective lenses do not overlap.

Another embodiment of the disclosure is a camera system, comprising: an objective lens as disclosed herein; a lens barrel having a back end, the lens barrel operably supporting the objective lens; a camera housing having an interior and a front end that supports a lens mounting fixture to which the back end of the lens barrel attaches; an image sensor operably disposed within the camera housing interior and at the image surface of the zoom lens when the lens barrel is attached to the camera housing; and camera electronics electrically connected to the image sensor.

Another embodiment of the disclosure is a camera system, comprising: a set of objective lenses comprising a plurality of objective lenses each as disclosed herein and having respective focal length intervals that are different from one another; a camera housing having an interior and a front end that supports a lens mounting fixture to which one of the objective lenses in the set of objective lenses operably attaches; an image sensor operably disposed within the camera housing interior and disposed at an image surface common to each of the objective lenses in the set of objective lenses; camera electronics electrically connected to the image sensor; and wherein each of the objective lenses provides imaging at the design focal lengths within its focal length interval when operably attached to the camera housing at the lens mounting fixture.

BRIEF DESCRIPTION OF THE DRAWINGS

FIG. 2C shows the Example 2 objective lens of FIG. 2A at its FL1=36.0 mm, FL2=43.1 mm, FL3=48.3 mm and FL4=54.0 mm design focal lengths and showing the axial movement of the tandem lens sub-group in the second lens group for changing focal length between the FL1, FL2, FL3 and FL4 configurations and also showing the axial movement of the rearward sub-group first lens group for changing focus.

FIG. 3B shows the Example 3 objective lens of FIG. 3A at its FL1=69.0 mm, FL2=95.3 mm, FL3=105.2 mm and FL4=114.0 mm design focal lengths and shows the axial movement of the tandem lens sub-group in the second lens group for changing focal length between the FL1, FL2, FL3 and FL4 configurations and also showing the axial movement of the rearward sub-group of the first lens group for changing focus.

FIG. 4B shows the Example 4 objective lens of FIG. 4A at its FL1=28.8 mm, FL2=34.5 mm, FL3=38.7 mm and FL4=43.3 mm design focal lengths and shows the axial movement of the tandem lens sub-group in the second lens group for changing focal length between the FL1, FL2, FL3 and FL4 configurations and also showing the axial movement of the rearward sub-group of the first lens group for changing focus.

Figure 1A:
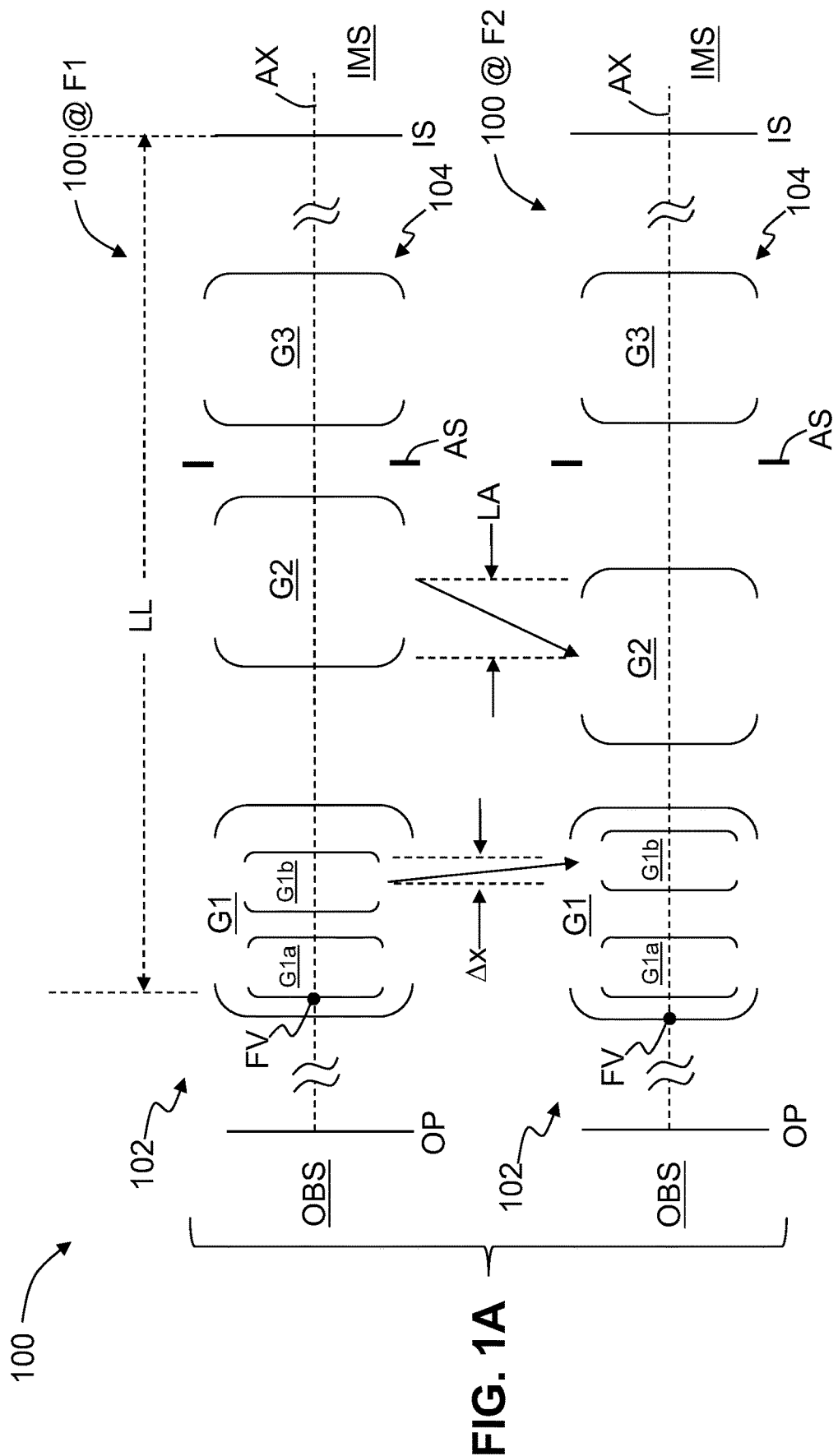
FIG. 1A is a generalized optical diagram of a first general embodiment of an objective lens as disclosed herein having two design focal lengths F1 and F2 and showing the axial movement of the second lens group for changing focal length between the FL1 and FL2 configurations and the axial movement of the first lens group for changing focus.

The information shown in the Figures, and the data contained in the Design Tables set forth below was generated by CodeV® optical design software, which is commercially available from SYNOPSYS, INC, Pasadena, Calif., USA.

DETAILED DESCRIPTION

The claims as set forth below are incorporated into and constitute part of this Detailed Description.

The term "lens group" as used herein means a set of one or more individual lens elements. The term "lens sub-group" as used herein means a sub-set of lens elements of a given lens group.

The terms "aperture stop", "optical stop" and "stop" are equivalent terms that can be used interchangeably.

The term "design focal length" is used herein to mean a focal length, denoted FL, at which the objective lens imaging has optimal focus.

Focus distances are denoted by the letter F, and in the discussion below range from a far or infinite focus F1 to a close or close-up focus F4, along with intermediate focuses F2 and F3, wherein F1>F2>F3>F4.

Terms having the form "between A and B" as used herein are intended to include A and B, so that the expression "between two design focal lengths and four design focal lengths" such as used in the specification and the claims means "two design focal lengths or three design focal lengths or four design focal lengths." Expressions that intend to exclude end points in given range for a given parameter K use the symbol "<", such as in the case for u<K<v, where the range on the parameter K does not include u or v.

The term "objective lens" as used herein means a lens that is designed to operate at multiple discrete design focal lengths, with the imaging at each of the focal lengths being maximized and having substantially the same imaging quality.

The term "focal-length ratio" is denoted FLR and is defined by $FL_{MAX}/FL_{MIN}$, where $FL_{MAX}$ is the maximum design focal length and $FL_{MIN}$ is the minimum design focal length.

The term "focal length interval" is denoted FLI and is the interval $FL_{MIN}$ to $FL_{MAX}$, so that by way of illustration, for the Example 2 objective lens discussed below where $FL_{MIN}$=36.0 mm and $FL_{MAX}$=54.0 mm, the focal length interval FLI is 36.0 mm to 54.0 mm. The focal length span FLS=$FL_{MAX}$-$FL_{MIN}$, which for the Example 2 lens is FLS=54.0 mm-36.0 mm=18.0 mm. In examples, the focal length interval FLI can fall entirely within what is considered in the art to be a wide-angle range or entirely within what is considered in the art to be a medium-angle range or entirely within what is considered in the art to be a narrow-angle (telephoto) range.

In other examples, the focal length interval FLI can overlap between the narrow-angle range and the medium angle range or between the medium angle range and the narrow-angle range.

The term "overlap" with respect to the focal length intervals refers to whether one focal length interval includes a portion of another focal length interval, i.e., overlap does not mean that one focal length interval equals another focal length interval (i.e., complete intersection), but rather includes a partial intersection of the two focal length intervals in question. Non-overlapping focal length intervals means that the focal length intervals in question do not intersect at all, i.e., do not have any portion of their focal length intervals in common. Focal length intervals are different if they do not have the same minimum and maximum focal lengths $FL_{MIN}$ and $FL_{MAX}$. Focal length intervals are said to partially overlap when the maximum focal length $FL_{MAX}$ of one of the focal length intervals is equal to or greater than the minimum focal length $FL_{MIN}$ of the other focal length interval.

The term "optically compensated" as used in connection with the objective lenses disclosed herein means that the objective lens is moved between focal lengths by either axially moving a single lens element or by axially moving multiple lens elements in tandem and thus in the same direction and by the same axial distance. The feature of the objective lenses disclosed here as being optically compensated can be stated in the negative or otherwise emphasized by stating that the objective lens is not mechanically compensated, which means that the objective lenses do not require the use of relatively complicated and expensive cam systems for setting the objective lenses to the different design focal lengths.

In the discussion below, a lens surface of a given lens element is said to be a front surface when it is the closest of the two lens surfaces to the object space. For example, for a positive meniscus lens disposed with its convex surface closest to the object space and its concave surface closest to the image space, the convex surface is referred to as a "front convex surface," while the concave surface can be referred to as a "rear concave surface."

The object space is immediately adjacent the front end of the objective lenses described below and so defines a frontward direction while the image space is immediately adjacent a back or rear end of the objective lens and so defines a rearward direction. Thus, certain lens sub-groups can be referred to as being frontward or forward while certain other lens sub-groups in the same lens group can be described as being rearward, with the understanding that in a given lens group, the frontward or forward lens sub-group is closer to the front end or object space than the rearward or rear lens sub-group.

The reference numbering convention for the lens elements and optical surfaces in the optical diagrams is selected to match the information provided in the corresponding lens design tables.

Basic Design

Figure 2A:
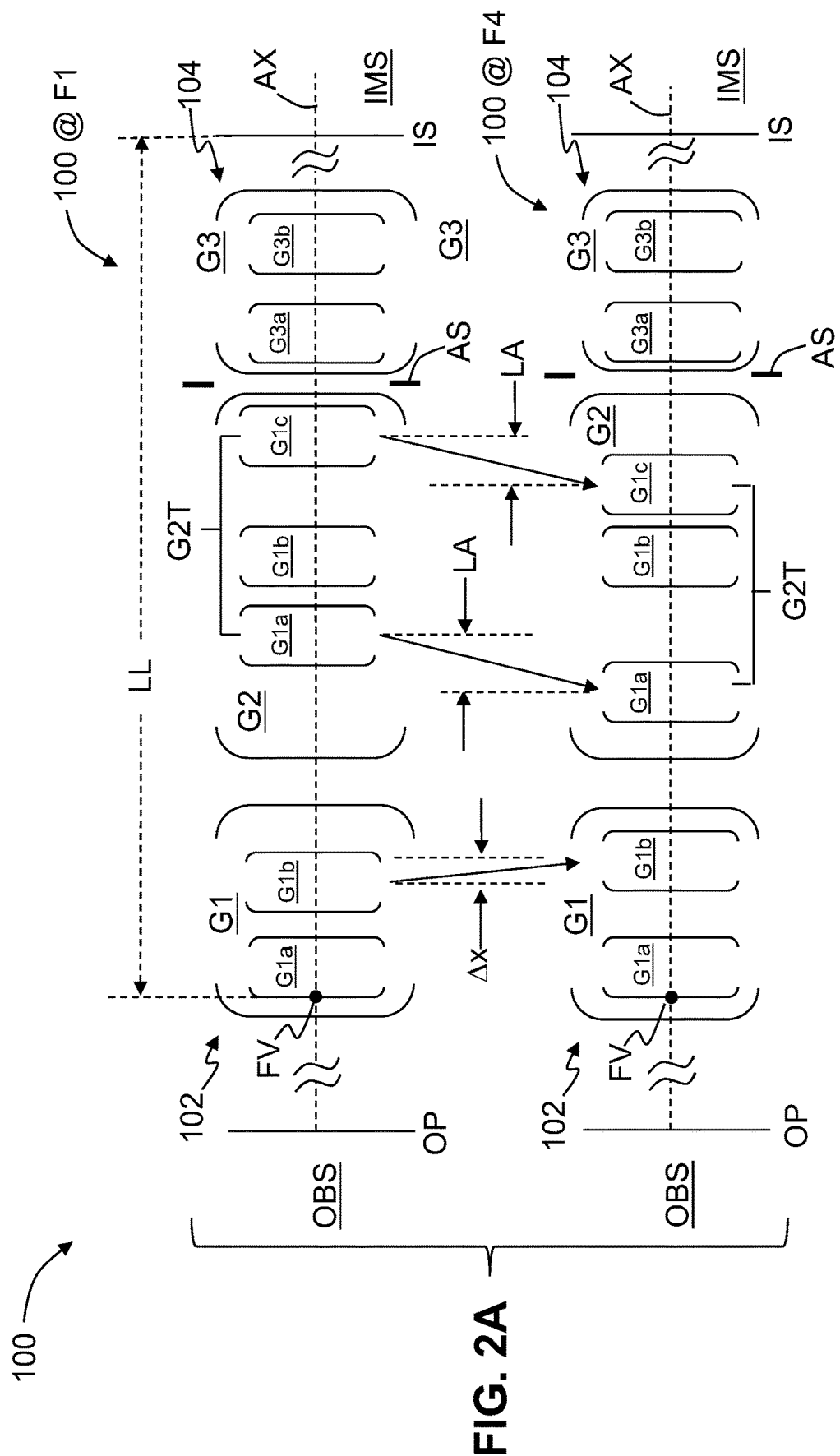
FIG. 2A is a generalized optical diagram of a second general embodiment of the objective lens as disclosed herein and having four design focal lengths FL1, FL2, FL3 and FL4, and showing the axial movement of the tandem lens sub-group of the second lens group for changing focal length between the FL1, FL2, FL3 and FL4 configurations and also showing the axial movement of the rearward sub-group of the first lens group for changing focus.

There are two basic general embodiments of the object lens as disclosed herein. FIG. 1A illustrates an example objective lens 100 according to a first general embodiment while FIG. 2A illustrates an example objective lens 100 according to a second general embodiment. Example objective lenses 100 based on the first and second general embodiments are described in detail below With reference to FIGS. 1A and 2A, the objective lens 100 has an optical axis AX, a front (or forward) end 102 that defines an object space OBS and a back end (or rear end or rearward end) 104 that defines an image space IMS. The objective lens 100 has an image surface IS that resides in the image space IMS and an object plane OP that resides in the object space OBS.

The objective lens 100 comprises, in order from the object space OBS to the image space IMS (i.e., objectwise to image wise) and along the optical axis AX: a first lens group G1 that has overall negative (−) power, a second lens group G2 that has overall positive (+) power, and a third lens group G3 that has overall positive (+) power. The lens groups have individual focal lengths f1, f2 and f3. An aperture stop AS resides either between the second lens group G2 and the third lens group G3 as shown in FIGS. 1A and 2A, or within the third lens group (see e.g. FIG. 3A).

The aperture stop AS is adjustable to define different F-numbers (F/#'s) of the objective lens 100. The F/# is taken at the image surface IS. In an example, for a fixed (constant) setting of the aperture stop AS, the F/# is substantially constant at each of the design focal lengths and over the focus range. In an example, "substantially constant" means that the F/# does not change more than ½ of the interval between adjacent aperture stop settings. For example, if an example objective lens 100 has adjacent aperture stop settings of F/#=2.8 and F/#=4.0 and is set at F/#=2.8, then the change in the F/# over the focus range is no more than (4.0−2.8)/2=0.6, so that the F/# will not exceed 3.4

The first lens group G1 includes a most objectwise stationary first lens sub-group G1a having overall negative (−) power followed immediately by a second lens sub-group G1b being axially movable and having positive (+) overall. The movable second lens sub-group G1b in the first lens group G1 is movable over an axial distance $\Delta x$ and used to provide in-focus images for different distances in the object space OBS. The first lens group G1 has a front vertex FV. The objective lens 100 has a lens length LL defined as the axial distance between the front vertex FV and the image surface IS. The front vertex FV is defined by the front surface S1 of the first lens element L1 in the example lenses below (see, e.g., FIG. 1B).

In the general embodiment of the objective lens 100 of FIG. 2A, the second lens group G2 can be formed by three (i.e., first, second and third) lens sub-groups G2a, G2b and G2c. The lens sub-groups G2a and G2c constitute a tandem lens sub-group G2T of the second lens group G2, wherein the two lens sub-groups G2a and G2c are configured to move axially and in tandem (and thus over the same axial distance as one another) to change the focal length between the three or four design focal lengths. Also, the third lens group G3 can be formed by two lens sub-groups G3a and G3b, wherein the latter is swappable with a different lens sub-group G3b' to change the design focal lengths and image size of the objective lens 100 without changing the lens length LL (and optionally without substantially changing the field of view in object space OBS), as discussed below (see FIGS. 5A, 5B). The aperture stop AS resides between the two lens sub-groups G3a and G3b of the third lens group G3.

The objective lens 100 has multiple focal lengths, and in an example has between two and four design focal lengths, i.e., can have as few as two design focal lengths FL1 and FL2 (e.g., FIG. 1A) and up to four design focal lengths F1, F2, F3 and F4 (e.g., FIG. 2A). The objective lens 100 can have more than four focal lengths, but it is believed that for many applications, two, three or four focal lengths will be sufficient.

Four example objective lenses 100 are set forth below, with the Example 1 objective lens (denoted 100(1)) having two design focal lengths FL1 and FL2 based on the first general embodiment, while the Example 2, Example 3 and Example 4 objective lenses (respectively denoted 100(2), 100(3) and 100(4)) have four design focal length FL1 through FL4 based on the second general embodiment.

One skilled in the art will appreciate that the example objective lenses 100 set forth herein enable an objective lens having three design focal lengths FL1, FL2 and FL3. In an example, the objective lens 100 can have three focal lengths FL1, FL2 and FL3, where FL1<FL2<FL3, wherein the difference $\Delta FL_{32}$=FL3−FL2 is greater than the difference $\Delta FL_{21}$=FL2−FL1, i.e., $\Delta FL_{32}$>$\Delta FL_{21}$. In some cases, it may be advantageous to have a three-focal length objective lens 100 having two movable lens sub-groups because there is more freedom in selecting where the intermediate design focal length FL2 resides as compared to adding a fourth design focal length FL4.

Note that in the case of two design focal lengths, FL1<LF2 so that FL1=$FL_{MIN}$ and FL2=$FL_{MAX}$. Likewise, in the case of three design focal lengths, FL1<FL2<FL3 so that FL1=$FL_{MIN}$ and FL3=$FL_{MAX}$, and in the case of four design focal lengths, FL1<FL2<FL3<FL4 so that FL1=$FL_{MIN}$ and FL4=$FL_{MAX}$.

While the objective lenses 100 disclosed can include one or more aspherical surfaces, in cases where cost reduction and design simplicity are important, the objective lenses can include only spherical surfaces, wherein a plano surface is considered a spherical surface and not an aspherical surface. Said differently, in an example, the objective lenses 100 do not include any aspherical surfaces. This has an advantage with respect to bokeh, which is the aesthetic quality of out-of-focus parts of an image. An all-spherical lens avoids the detrimental "onion ring" effect on bokeh associated with the use of aspherical lens elements.

The objective lenses 100 disclosed herein are optically compensated, i.e., changing between the design focal lengths FL of the objective lens 100 involves moving either one lens group (FIG. 1A) or moving multiple lens sub-groups in tandem (FIG. 2A) in other words each by the same axial distance. This has the advantage that the objective lenses can employ a simpler and less costly mechanical system for moving either one lens group or moving multiple lens sub-groups in tandem than as used for moving multiple lens groups which do not move in tandem. In an example, the lens-movement system of the objective lenses disclosed herein can utilize a single cam slot rather than multiple cam slots. The single cam slot system is more precise and reliable and can consistently maintain focus of a high-performance image at the design focal lengths. The single cam slot system is also easier to maintain.

The objective lenses 100 disclosed herein can be configured so that the lens length LL remains unchanged when changing focus and further in an example the lens length remains unchanged when also changing between the design focal lengths. Further in the example, the lens length LL also stays constant when swapping out the sub-lens group G3b in the third lens group for a new sub-lens group G3b', as described in greater detail below in connection with FIGS. 5A and 5B. This property of the lens length LL not changing when changing focus, design focal length and/or third lens group configuration is important because it obviates the need to change a calibrated focus scale for the objective lens based on a given (e.g., the original) lens length LL.

While the example objective lenses 100 are shown in the above-cited Figures in isolation for ease of explanation, in examples it may be preceded by or followed by any number of optics within the scope of the present disclosure.

Design Considerations

The objective lenses 100 disclosed herein are based on a number of design considerations that seek to imbue the objective lenses with the imaging performance characteristics and the physical characteristics of contemporary prime lenses at the design focal lengths.

1. Travel-to-Focal-Length (TFL) Ratio R

The objective lens 100 utilizes either the movement of a single lens group or the tandem movement of two axially movable lens groups to change the focal length. Of these axially movable lens groups, one of them will have a shortest focal length $f_s$ (i.e., the highest optical power). The total amount or distance of axial travel ("travel length") of the shortest-focal-length lens group to change between the shortest and longest design focal lengths FL of the given objective lens is LA (see FIGS. 1A and 2A). The parameters LA and $f_s$ define a travel-to-focal-length (TFL) ratio R=LA/$f_s$. In the examples below where two lens groups are axially movable, the two axially movable lens groups constitute a single "tandem lens sub-group" wherein the two axially movable lens sub-groups G2a and G2c move in tandem, i.e., over the same axial distance.

A design consideration for the objective lenses 100 disclosed herein is that in the most general example the TFL ratio R=LA/$f_s$ is in the range 0.05<R<0.40, or alternatively in the range 0.05<R<0.35 or in the range 0.05<R<0.30.

2. Focal-Length Ratio FLR

Another design consideration is that the range of focal lengths of the objective lens 100, as represented by the focal-length ratio FR, is in the range 1.05<FLR≤2.75. The focal-length ratios within this range are quite small as compared to conventional optically compensated zoom lenses. In fact, the focal-length ratios in this range are so small that the zooming effect is diminished to the point of being of little practical use, and is much less than the conventional minimum counterpart zoom ratio ZR, wherein ZR>3 for conventional optically compensated zoom lenses.

The larger zoom ratios associated with conventional optically compensated zoom lenses create greater defocus at the image plane. When the amount of defocus is reduced in such lenses while trying to keep the lens length the same, image quality over the focal length range suffers, and the image quality at the in-focus focal lengths is inconsistent. The amount of defocus can be reduced by allowing the lens length to change substantially, e.g., up to twice the original lens length, so that maintaining lens compactness and low cost is problematic. When these shortcomings and tradeoffs are not acceptable, the general approach in the art is to move to a mechanically compensated zoom lens, which will provide better performance but with increased complexity and cost.

3. Maximizing Imaging Performance at the Design Focal Lengths

Another design consideration is directed to maximizing imaging performance at the design focal lengths and made consistent at the design focal lengths at the expense of the imaging performance between the design focal lengths.

Theoretically, if there is one (N) axially movable positive (+) power zoom lens group, then up to two focal lengths (2N) are in focus at the image (i.e., two design focal lengths) can be obtained. If there are two axially movable positive (+) power zoom lens groups (with an axially stationary negative (−) power lens group in between said two axially movable positive (+) lens groups), then up to four focal lengths can be in focus at the image plane (i.e., four design focal lengths) can be obtained. If there are three axially movable positive (+) power zoom lens groups (with two axially stationary negative (−) power lens groups in between said two axially movable positive (+) power lens groups), then up to six focal lengths can be in focus at the image plane (i.e., six design focal lengths) can be obtained, and so on.

In some example objective lenses disclosed herein, the focusing performance at one or more locations between adjacent focal lengths can be quite poor, and even with refocusing the MTF may still be deemed unacceptable for a conventional zoom lens.

The main purpose of a conventional zoom lens is to provide zooming, and in the case of an optically compensated zoom lens, is to reduce the defocus at the image and make the image quality acceptable at every position within the focal length range, with less priority given to size, weight and cost. Therefore, optically compensated zoom lenses concentrate on means to reduce the defocus at focal lengths that are otherwise out of focus, and this tends to increase the size, weight and cost, and in particular increases the number of lens elements required.

4. Object Space Focusing

Contemporary prime lenses provide focusing over object space distances from far (infinity) to very close to the front of the lens. Since one use of the objective lenses 100 disclosed herein is as a substitute for having to use multiple prime lenses, examples of the objective lenses disclosed herein also have substantially the same object-space focusing properties as a high-performance prime lens. This is accomplished by having the negative (−) power front focusing lens group G1 constituted by the axially stationary negative (−) power sub lens group G1$a$ followed by the axially movable positive (+) power positive lens sub group G1$b$, which is movable to provide in-focus images for different object space distances.

5. Breathing

Breathing is the change in field size (or field angle or magnification) when focusing. Contemporary prime lenses have relatively small amounts of breathing as compared to conventional optically compensated zoom lenses. Thus, a design consideration for the objective lens disclosed herein is to minimize breathing to the point where it substantially matches that of a conventional prime lens, especially at the shortest focal lengths.

In examples, the breathing B (%) is in the range $-7.5\% \leq B \leq +15.0\%$ or more preferably $-2.0\% \leq B \leq +7.0\%$. In the example objective lens 100 disclosed herein, the amount of breathing B (%) is in the range from $-1.7\% \leq B \leq +6.3\%$. The largest value of +6.3% is at the longest focal length, which has very close focusing down to a magnification of 1:4.5, where the size of the object is 4.5× the size of the image, thus limiting the reduction of breathing.

The relatively small amount of breathing is accomplished in the objective lenses disclosed herein by selecting the magnitude of powers of lens sub-groups G1$a$ and G1$b$ and as well as those of the other axially movable lens elements for changing the focal length to reduce changes in the field of view throughout the focus range. This allows for the front focusing lens group G1 to be compact, low weight and low cost, and allows for low focus breathing, especially at the shortest focal lengths.

6. Minimizing the Number of Lens Elements and Lens Size

Prime lenses have a single design focal length, so that the number of lens elements in such lenses is typically if not always fewer than that for zoom lenses, which needs to be corrected to operate at multiple design focal lengths. As noted above, since examples of the objective lenses disclosed herein seek to emulate the image performance and physical characteristics of high-performance prime lenses, minimizing the number of lens elements used in the objective lens while maintaining high performance at the design focal lengths allows it to approach the size (e.g., lens length), weight and cost of a prime lens. This allows for similar storage size and transportation costs as that for prime lenses.

The objective lens weight W is defined by the total glass weight and estimated weight of a metal lens barrel, and in the four examples below is in the range 1.5 kg W 2.6 kg. Of course objective lenses as disclosed herein can be made to have an objective lens W well outside of this range, depending on the application. In an example, the objective lens weight W is targeted to be about the same as a high-performance prime lenses that the objective lens can replace.

Example Objective Lenses

Four example objective lenses 100, referred to as Examples 1 through Example 4 and denoted 100(1) through 100(4) respectively, are now discussed in detail. The design Tables for each of the lenses are provided in the Design Tables section at the end of this Detailed Description section.

Example 1—Wide-Angle Lens with Two Design Focal Lengths

Figure 1B:
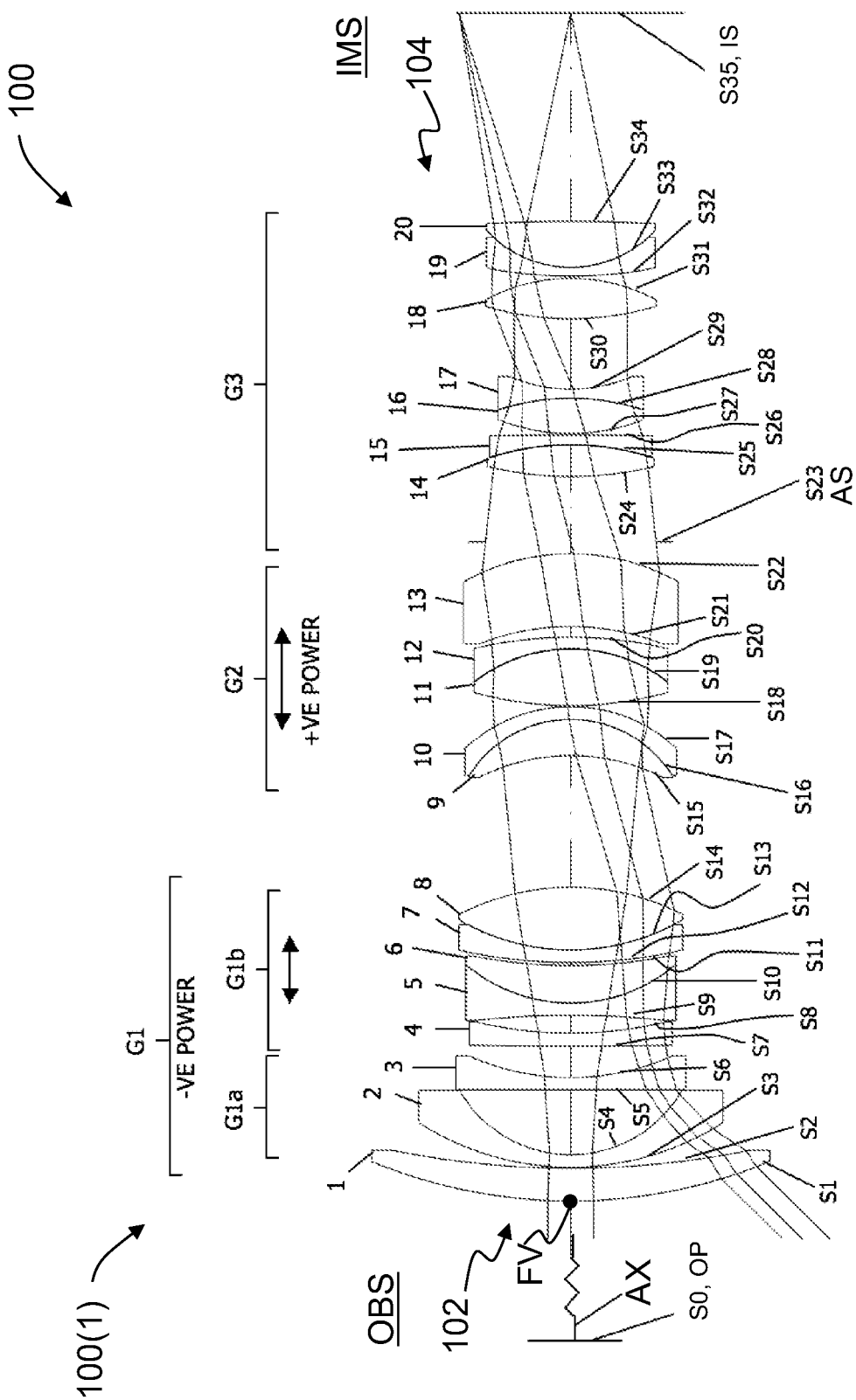
FIG. 1B is a detailed optical diagram of an example objective lens (Example 1) according to the first general embodiment of FIG. 1A, wherein the two design focal lengths are FL1=22 mm and FL2=28.0 mm.
Figure 1C:
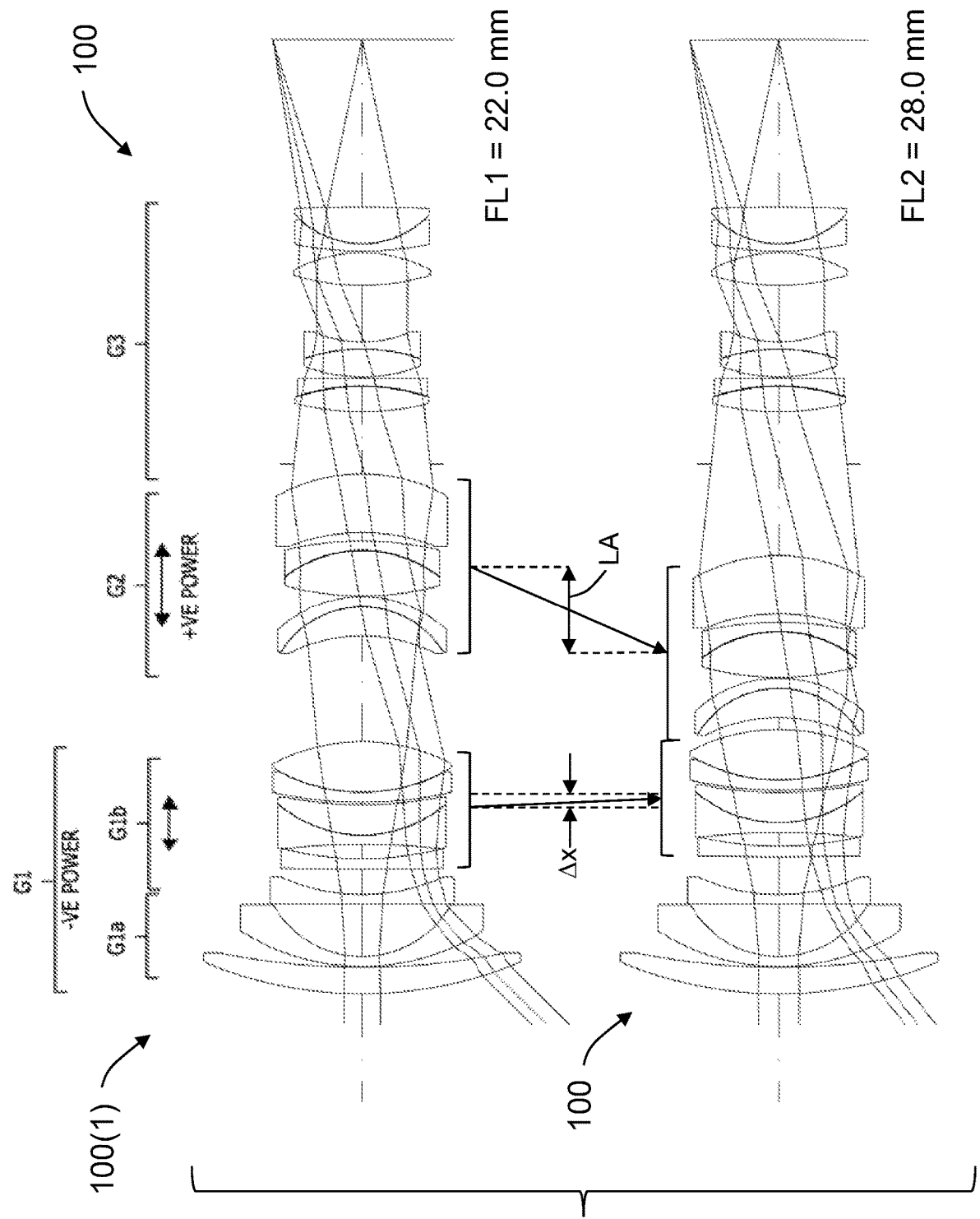
FIG. 1C shows the Example 1 objective lens of FIG. 1B at its FL1=22.0 mm and FL2=28.0 mm design focal lengths and shows the axial movement of the second lens group for changing the focal length along with axial movement of a rearward sub-group of the first lens group for changing focus.

FIG. 1B is a detailed optical diagram of an example objective lens (Example 1) 100(1) according to the first general embodiment of the objective lens 100 of FIG. 1A, wherein the two design focal lengths are FL1=22.0 mm and FL2=28.0 mm. FIG. 1C shows the Example 1 objective lens 100(1) of FIG. 1B at its FL1=22.0 mm and FL2=28.0 mm design focal lengths and also shows the axial movement of the second lens group G2 over an axial distance LA for changing the design focal length, and also shows the axial movement Δx of the first lens group G1 for changing focus.

The design focal lengths FL1 and FL2 of 22.0 mm and 28.0 mm make the Example 1 objective lens 100(1) a relatively wide-angle lens. The focal-length ratio FLR=FL2/FL1=28.0 mm/22.0 mm=1.27. FIG. 1B is shown for a focal distance F1 of infinity. The views in FIG. 1C show the configuration of the Example 1 objective lens 100(1) at the two design focal lengths and for focuses ranging from F1 to F4, where F1 is infinity focus and F4 is close-up focus.

A specific example of the Example 1 objective lens 100(1) at a full aperture of f/2.5 is set forth in Table 1A, while Table 1B sets forth image quality data, including polychromatic MTF performance for the two design focal lengths FL1 and FL2 at the intermediate focus distance F2. Table 1C is a summary of additional design parameters.

The Example 1 objective lens 100(1) has N=20 total lens elements, which are numbered 1 through 20. There are also 36 optical surfaces numbered S0 through S35. The object plane OP constitutes surface S0 while the image surface IS constitutes surface S35. The aperture stop AS constitutes surface S23.

The N=20 lens elements of the Example 1 wide-angle objective lens 100(1) are dispersed among the three lens groups G1 through G3.

The first lens group G1 consists of lens elements 1 through 8 divided up between a forward first lens sub-group G1a and a rearward second lens sub-group G1b. The first lens sub-group G1a consists of lens elements 1 through 3, wherein lens element 1 is positive meniscus with a front convex surface S1, lens element 2 is negative meniscus with a front convex surface S3, and lens element 3 is plano-meniscus with a front plano surface S5.

The second lens sub-group G1b consists of lens elements 4 through 8, wherein lens element 4 is negative meniscus with a front convex surface S7, lens 5 is biconcave, lens element 6 is positive meniscus with a front convex surface S10 (with lens elements 5 and 6 forming a doublet), lens element 7 is negative meniscus with a front convex surface S12, and lens element 8 is biconvex (with lens elements 7 and 8 forming a doublet).

The second lens group G2 consists of lens elements 9 through 13. The second lens group G2 is movable as a whole to change between the design focal lengths FL1 and FL2. Lens element 9 is positive meniscus with a front concave surface S15, lens element 10 is negative meniscus with a rear convex surface S17 (with lens elements 9 and 10 forming a doublet), lens element 11 is biconvex, lens element 12 is negative meniscus with a front concave front S19 (with lens elements 11 and 12 forming a doublet), and lens element 13 is negative meniscus with a front concave surface S21.

The aperture stop AS is located between lens groups G2 and G3 and as noted above constitutes surface S23.

The third lens group consists of lens elements 14 through 20. Lens element 14 is biconvex, lens element 15 is negative meniscus with a front concave surface S25 (with lens elements 14 and 15 forming a doublet), lens element 16 is biconvex, lens element 17 is biconcave (with lens elements 16 and 17 forming a doublet), lens element 18 is biconvex, lens element 19 is negative meniscus with a front convex surface S32, and lens element 20 is biconvex (with lens elements 19 and 20 forming a doublet).

As noted above, the second group G2 is axially movable to change between the two design focal lengths FL1 and FL2 while producing at least one image at substantially constant focus at the image surface IS in the image space IMS. The second lens group G2 moves over an axial distance LA=19.87 mm over the focal length interval FLI between FL1=22.0 mm and FL2=28.0 mm (see FIG. 1B). The overall focal length of the second lens group G2 is f2=82.012 (see Table 1C).

Since only the second lens group G2 moves to change between the design focal lengths, $f2=f_s=82.012$ mm, so that the TFL ratio $R=LA/f_s=LA/f2=19.87/82.012$ mm=0.24, which satisfies the design condition of 0.05<R<0.40.

Example 2—Medium-Angle Lens with Four Design Focal Lengths

Figure 2B:
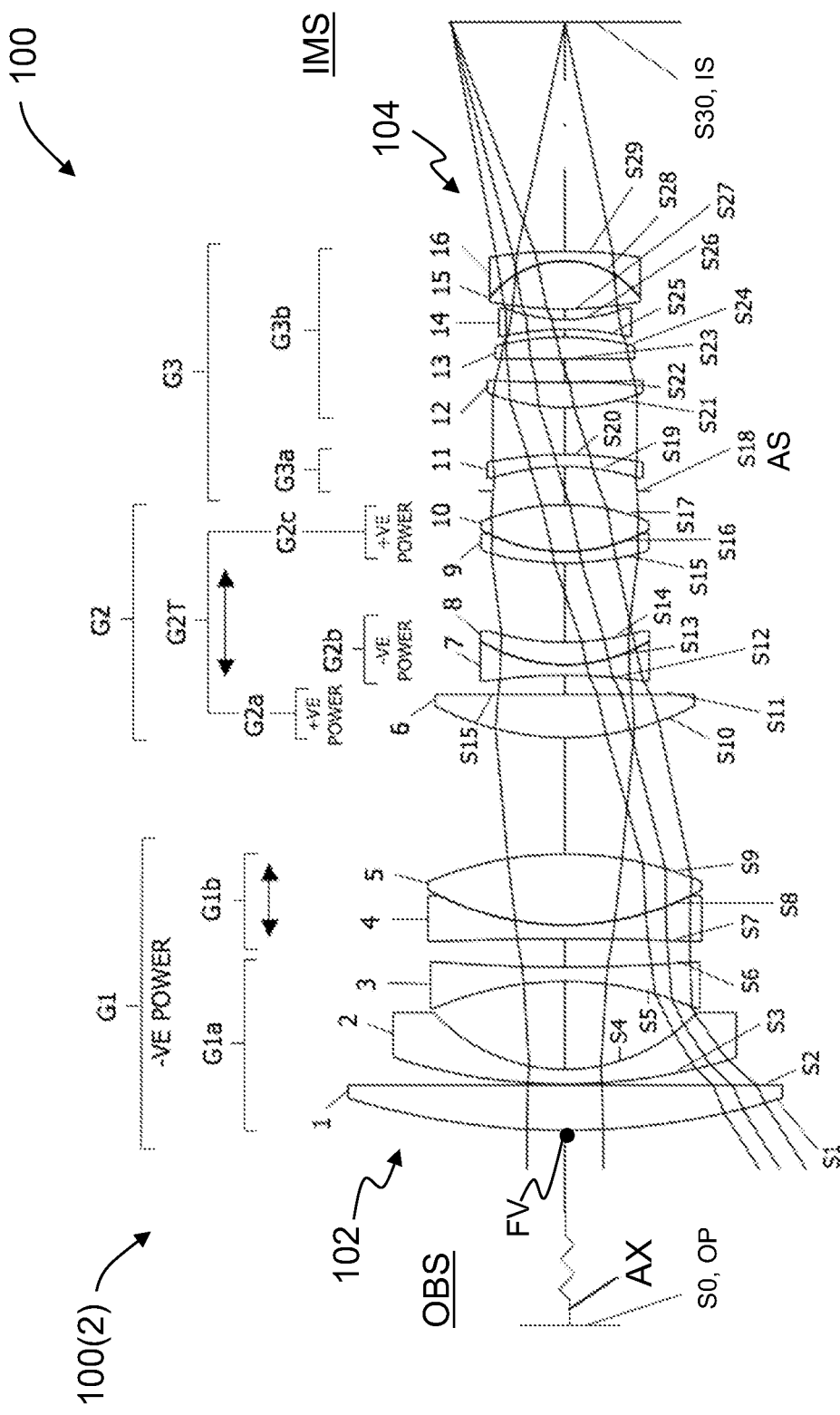
FIG. 2B is a detailed optical diagram of a second example (Example 2) objective lens as disclosed herein based on the second general embodiment of FIG. 2A and having four design focal lengths FL1=36.0 mm, FL2=43.1 mm, FL3=48.3 mm and FL4=54.0 mm.

FIG. 2B is a detailed optical diagram of a second example (Example 2) objective lens 100(2) as disclosed herein based on the second general embodiment of the objective lens 100 of FIG. 2A. The Example 2 objective lens 100(2) has four design focal lengths FL1=36.0 mm, FL2=43.1 mm, FL3=48.3 mm and FL4=54.0 mm.

FIG. 2C shows the Example 2 objective lens 100(2) at its FL1=36.0 mm, FL2=43.1 mm, FL3=48.3 mm and FL4=54.0 mm design focal lengths and shows the axial movement of the tandem lens sub-group G2T in the second lens group over the axial distance LA for changing focal length between the FL1, FL2, FL3 and FL4 configurations and also shows the axial movement of the first lens group over the distance Δx for changing focus.

The four focal lengths of the Example 2 objective lens 100(2) make the objective lens a medium-angle lens, i.e., midway between wide-angle and telephoto. The focal-length ratio FLR=FL4/FL1=54.0 mm/36.0 mm=1.50. The views in FIG. 2C show the configuration of the Example 2 objective lens 100(2) at the four design focal lengths and for focuses ranging from F1 to F4, where F1 is infinity focus and F4 is close-up focus.

A specific example of the Example 2 objective lens 100(2) at a full aperture of f/2.5 is set forth in Table 2A, while Table 2B sets forth image quality data, including polychromatic MTF performance for the four design focal lengths FL1, FL2, FL3 and FL4 at the intermediate focus distance F2. Table 2C is a summary of additional design parameters.

The Example 2 objective lens 100(2) has N=16 total lens elements dispersed among the three lens groups G1 through G3. The first lens group G1 consists of lens elements 1 through 5 divided up between a forward first lens sub-group G1a and a rearward second lens sub-group G1b. The first lens sub-group G1a consists of lens elements 1 through 3, wherein lens element 1 is plano-convex with a front convex surface S1, lens element 2 is negative meniscus with a front convex surface S3, and lens element 3 is biconcave. The second lens sub-group G1b consists of lens elements 4 and 5, wherein lens element 4 is biconcave and lens 5 is biconcave (with lens elements 4 and 5 forming a doublet).

The lens group G2 consists of lens elements 6 through 10 and is divided up into three lens sub-groups, namely a forward first lens sub-group G2a having overall positive (+) power and consisting of lens 6, a second middle lens sub-group G2b having overall negative (−) power and consisting of lens elements 7 and 8, and a third rearward lens sub-group G2c having overall positive (+) power and consisting of lens elements 9 and 10.

Lens element 6 of the first lens sub-group G2a is positive meniscus with a front convex surface S10. For the second sub-lens group G2b, the lens element 7 is biconcave, and the lens element 8 is positive meniscus with a front convex surface S13 (with lens elements 7 and 8 forming a doublet). For the third sub-lens group G2c, the lens element 9 is negative meniscus with a front convex surface S15 and the lens element 10 is biconvex (with lens elements 9 and 10 forming a doublet).

The first and third lens sub-groups G2a and G2c of the second lens group G2 constitute a tandem lens sub-group G2T wherein the first and third lens sub-groups G2a and G2c therein move in tandem to change between the design focal lengths FL1 through FL4, and in particular move over an axial length LA between the first focal length FL1 and the fourth focal length FL4.

The aperture stop AS is located between lens groups G2 and G3 and constitutes surface S18.

The third lens group G3 consists of lens elements 11 through 16 and is divided up into two lens sub-groups, namely a first forward lens sub-group G3a having overall negative (−) power and consisting of lens element 11, and a second rearward lens sub-group G3b having an overall positive (+) power and consisting of lens elements 12 through 16.

For the first lens sub-group G3a, lens 11 is negative meniscus with a front concave surface S19. For the second lens sub-group G3b, the lens element 12 is positive meniscus with a front convex surface S21, the lens element 13 is plano-convex with a front plano surface S23, the lens element 14 is biconcave, the lens element 15 is biconvex, and the lens element 16 is negative meniscus with front concave surface S28 (with the lens elements 15 and 16 forming a doublet).

The tandem lens sub-group G2T is axially movable to provide the above-described change in the design focal length over the focal range FLI between the short focal length FL4=36.0 mm and the long focal length FL4=54.0 mm while producing at least one image at substantially constant focus at the image surface IS in the image space IMS.

Of the two lens sub-groups G2a and G2c that make up the tandem lens sub-group G2T, the first lens sub-group group G2a has the focal length f2a shorter than the focal length f2c of the third lens sub-group G2c, so that $f2a=f_s=59.085$ mm. The tandem lens sub-group G2T moves over an axial distance LA=12.6 mm over the focal range FLR so that the TFL ratio R=LA/f2c=12.6/59.085 mm=0.21, which satisfies the design condition of 0.05<R<0.4.

Example 3—Narrow-Angle Lens with Four Design Focal Lengths

Figure 3A:
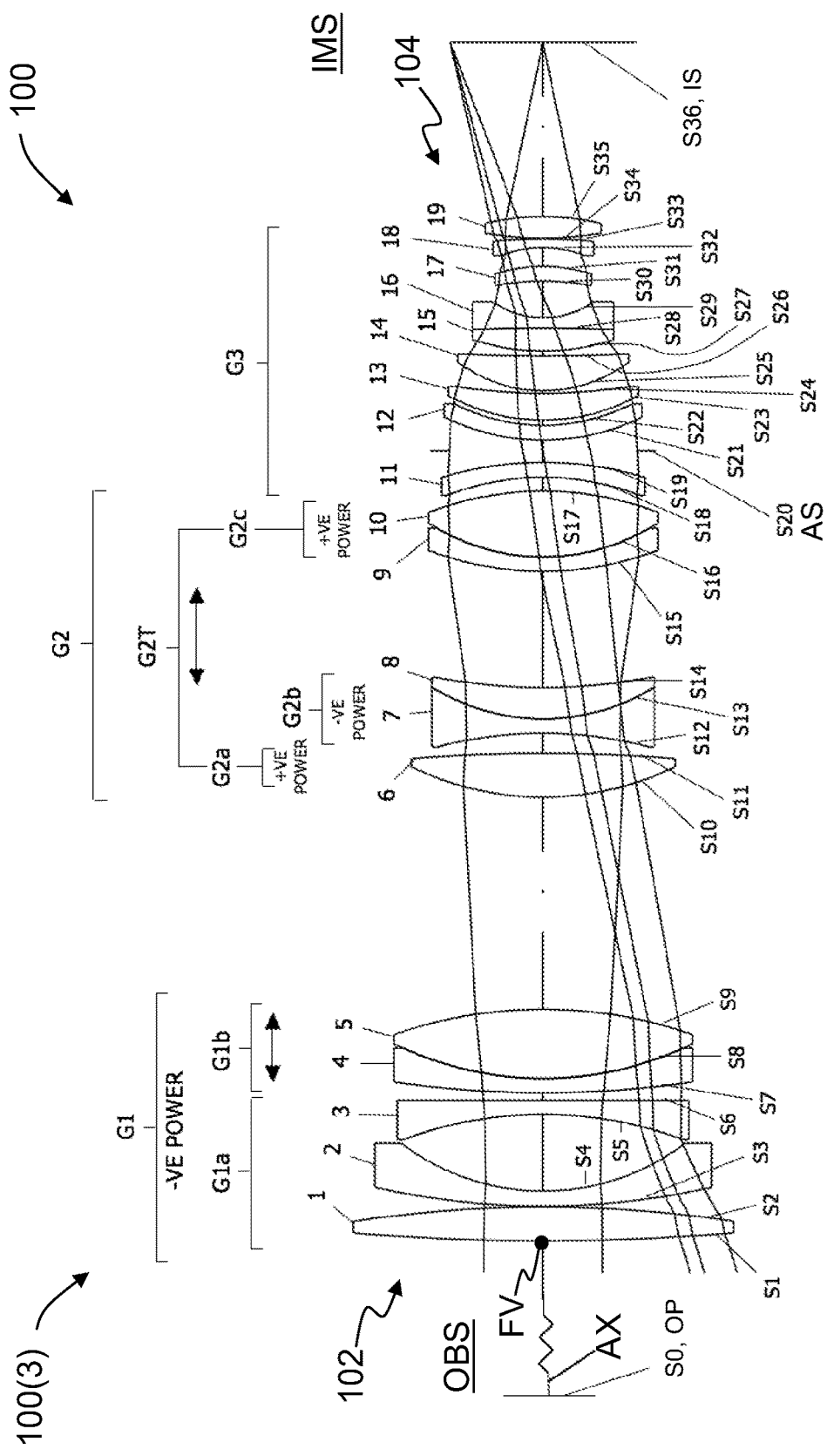
FIG. 3A is a detailed optical diagram of a third example (Example 3) objective lens as disclosed herein based on the second general embodiment of FIG. 2A and having four design focal lengths FL1=69.0 mm, FL2=95.3 mm, FL3=105.2 mm and FL4=114.0 mm.

FIG. 3A is a detailed optical diagram of a third example (Example 3) objective lens 100(3) as disclosed herein based on the second general embodiment of FIG. 2A and having four design focal lengths FL1=69.0 mm, FL2=95.3 mm, FL3=105.2 mm and FL4=114.0 mm.

FIG. 3B shows the Example 3 objective lens 100(3) of FIG. 3A at its FL1=69.0 mm, FL2=95.3 mm, FL3=105.2 mm and FL4=114.0 mm design focal lengths and shows the axial movement of the tandem lens sub-group G2T in the second lens group G2 over the axial length LA for changing focal length between the FL1, FL2, FL3 and FL4 configurations and also shows the axial movement of the first lens group over an axial distance Δx for changing focus.

The focal lengths of the Example 3 objective lens 100(3) make this a relatively narrow-angle (telephoto) lens. The focal-length ratio FLR=FL4/FL1=114.0 mm/69.0 mm=1.65.

A specific example of the Example 3 objective lens 100(3) at a full aperture of f/2.5 is set forth in Table 3A, while Table 3B sets forth image quality data, including poly-chromatic MTF performance for the four design focal lengths FL1, FL2, FL3 and FL4 at the intermediate focus F2. Table 3C is a summary of additional design parameters.

The Example 3 objective lens 100(3) has 19 lens elements dispersed among the three lens groups G1 through G3.

The first lens group G1 consists of lens elements 1 through 5. The first lens sub-group G1a consists of lens elements 1 through 3, wherein lens element 1 is biconvex, lens element 2 is negative meniscus with a front convex surface S3, and lens element 3 is negative meniscus with a front concave surface S5. The second lens sub-group G1b consists of lens elements 4 and 5, wherein lens element 4 is negative meniscus with a convex front surface S7 and lens element 5 is biconvex (with lens elements 4 and 5 forming a doublet).

The second lens group G2 consists of lens elements 6 through 10 and is divided up into three lens sub-groups, namely a first lens sub-group G2a having overall positive (+) power and consisting of lens 6, a second lens sub-group G2b having overall negative (−) power and consisting of lens elements 7 and 8, and a third lens sub-group G1c having overall positive (+) power and consisting of lens elements 9 and 10.

The lens element 6 of the first lens sub-group G2a is biconvex. For the second sub-lens group G2b, the lens element 7 is biconcave, and the lens element 8 is positive meniscus with a front convex surface S13 (with lens elements 7 and 8 forming a doublet). For the third sub-lens group G2c, the lens element 9 is negative meniscus with a front convex surface S15 and the lens element 10 is biconvex (with lens elements 9 and 10 forming a doublet).

The first and third lens sub-groups G2a and G2c of the second lens group G2 constitute a tandem lens sub-group G2T wherein the first and third lens sub-groups G2a and G2c therein move in tandem to change between the design focal lengths FL1 through FL4, and in particular move over an axial length LA between the first focal length FL1 and the last focal length FL4.

The third lens group G3 has overall positive (+) power and consists of lens elements 11 through 19. The aperture stop AS is located between lens elements 11 and 12 in the third lens group G3 and constitutes surface S20.

The lens 11 is negative meniscus with a front concave surface S18, the lens element 12 is positive meniscus with a front convex surface S21, the lens element 13 is positive meniscus with a front convex surface S23, the lens element 14 is positive meniscus with a front convex surface S24, the lens element 15 is biconvex, the lens element 16 is biconcave (with lens elements 15 and 16 forming a doublet), the lens 17 is positive meniscus with a front concave surface S30, lens 18 is negative meniscus with a front concave surface S32, and lens 19 is biconvex.

The tandem lens sub-group G2T is axially movable to provide the above-described change in the design focal length over the focal length interval FLI between the short focal length FL1=69.0 mm and the long focal length FL4=114.0 mm while producing at least one image at substantially constant focus at the image surface IS in the image space IMS.

Of the two lens sub-groups G2a and G2c that make up the tandem lens sub-group G2T, the third lens sub-group group G2c has the focal length f2c shorter than the focal length f2a of the first lens sub-group G2a, so that $f2c=f_s=95.122$ mm. The tandem lens sub-group G2T moves over an axial distance LA=24.901 mm over the focal range FLR so that the TFL ratio R=LA/f2c=24.901/95.122 mm=0.26, which satisfies the design condition of R<0.40.

Note that the focal length intervals FLI for the three example lenses described above do not overlap, with the Example 1 focal length interval FLI being 22 mm to 28 mm in the wide-angle range, the Example 2 focal length interval being 36 mm to 54 mm in the medium-angle range, and the Example 3 focal length interval being 69 mm to 114 mm in the narrow-angle range.

Example 4—Wide-Angle Lens with Four Design Focal Lengths

Figure 4A:
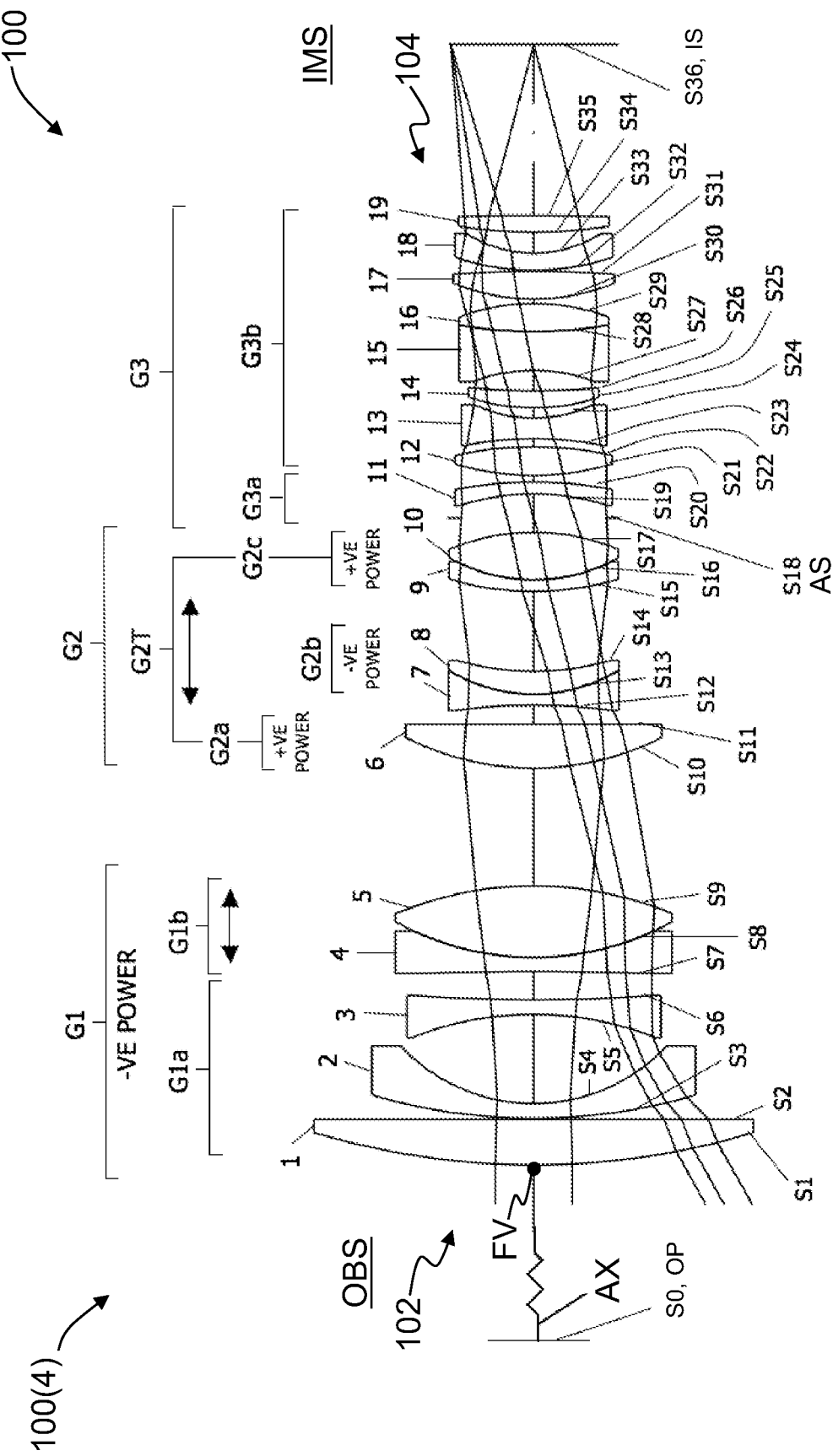
FIG. 4A is a detailed optical diagram of a fourth example (Example 4) objective lens as disclosed herein based on the second general embodiment of FIG. 2A and having four design focal lengths FL1=28.8 mm, FL2=34.5 mm, FL3=38.7 mm and FL4=48.3 mm.

FIG. 4A is a detailed optical diagram of a fourth example (Example 4) objective lens 100(4) as disclosed herein based on the second general embodiment of FIG. 2A and having four design focal lengths FL1=28.8 mm, FL2=34.5 mm, FL3=38.7 mm and FL4=43.3 mm.

FIG. 4B shows the Example 4 objective lens 100(4) of FIG. 4A at its FL1=28.8 mm, FL2=34.5 mm, FL3=38.7 mm and FL4=43.3 mm design focal lengths and shows the axial movement of the tandem lens sub-group G2T in the second lens group G2 over an axial distance LA for changing focal length between the FL1, FL2, FL3 and FL4 configurations, and also shows the axial movement of the first lens group G1 over an axial distance Δx for changing focus.

The four focal lengths of the Example 4 objective lens 100(4) make the lens a relatively wide-angle lens. The focal-length ratio FLR=FL4/FL1=43.3 mm/28.8 mm=1.50.

A specific example of Example 4 objective lens 100(4) at a full aperture of f/2.0 is set forth in Table 4A, while Table 4B sets forth image quality data, including polychromatic MTF performance for the four design focal lengths FL1, FL2, FL3 and FL4 at the intermediate focus distance F2.

Table 4C is a summary of additional design parameters.

The Example 4 objective lens 100(4) has N=19 total lens elements dispersed among the three lens groups G1 through G3.

The first and second lens groups G1 and G2 have the same configuration as in the Example 2 objective lens 100(2) as described above, and the aperture stop AS is located between lens groups G2 and G3, also as in the Example 2 objective lens.

The third lens group G3 has overall positive (+) power and consists of lens elements 11 through 19. The third lens group G3 is divided into two lens sub-groups G3a and G3b. The first sub-lens group G3a consists of lens element 11 while the second sub-lens group G3b consists of lens elements 12-19. The first sub-lens group G3a for this Example 4 objective lens 100(4) is also the same as that for the Example 2 objective lens 100(2), namely consists of the negative meniscus lens element 11 having a front concave surface S19.

For the second sub-lens group G3b, the lens element 12 is biconvex, the lens element 13 is biconcave, the lens element 14 is positive meniscus with a front convex surface S25, the lens element 15 is biconcave, the lens element 16 is biconvex (with lens elements 15 and 16 forming a doublet), lens 17 is biconvex, lens 18 is negative meniscus with front convex surface S32, and lens 19 is biconvex.

The tandem lens sub-group G2T is axially movable to provide the above-described change in the design focal length over the focal length interval between the short focal length FL1=28.8 mm and the long focal length FL4=43.3 mm, while producing at least one image at substantially constant focus at the image plane IP in the image space IS.

Of the two lens sub-groups G2a and G2c that make up the tandem lens sub-group G2T, the first lens sub-group group G2a has the focal length f2a shorter than the focal length f2c of the third lens sub-group G2c, so that f2a=$f_s$=−59.085 mm. The tandem lens sub-group G2T moves over an axial distance LA=12.603 mm over the focal range FLR so that the TFL ratio R=LA/f2c=12.603 mm/59.085 mm=0.21, which satisfies the design condition of R<0.40.

Rear Swappable Optics

Figure 5A:
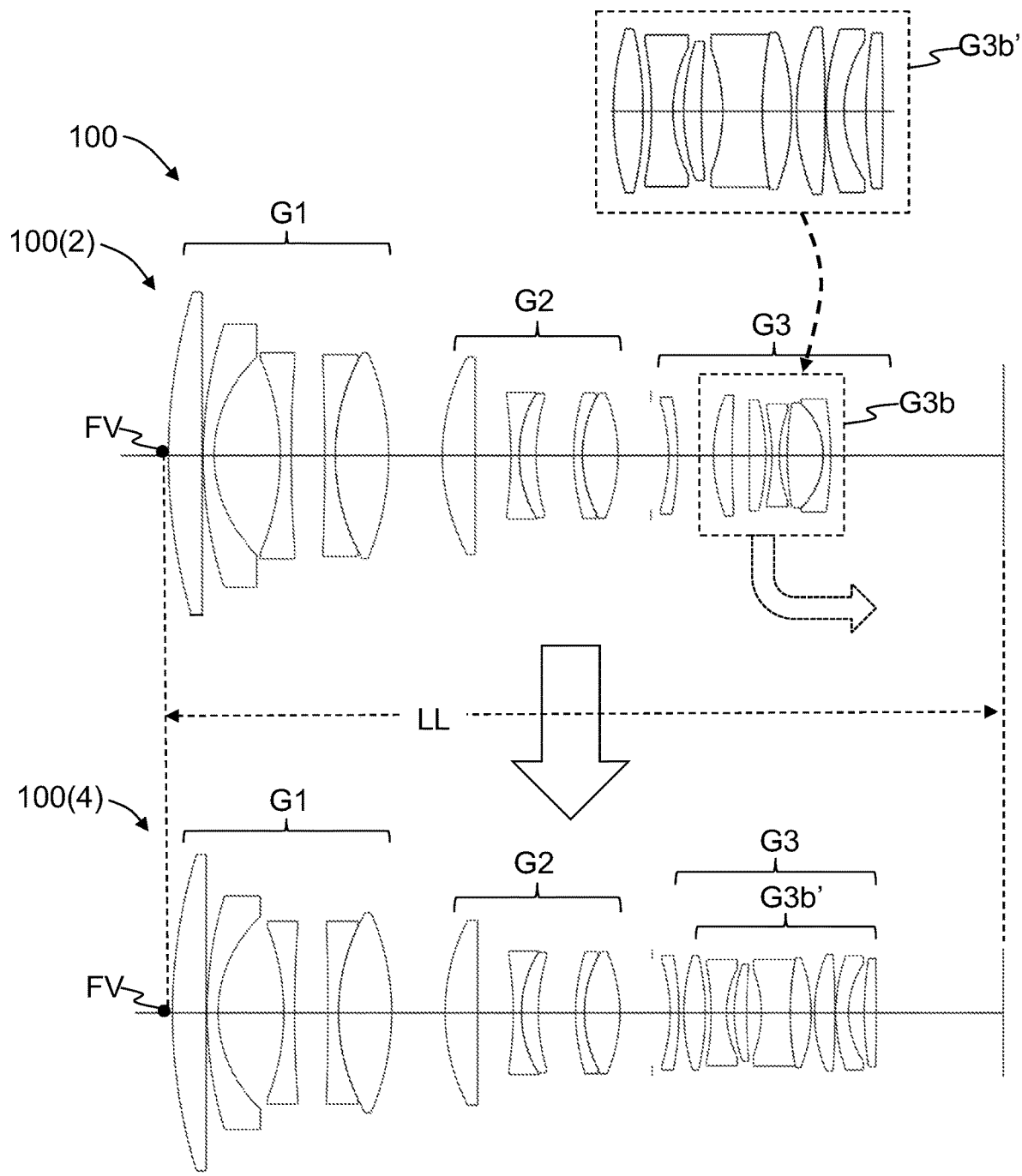
FIG. 5A is an optical diagram showing how the Example 2 lens can be modified by replacing the second lens sub-group G3b of the third lens group G3 to arrive at the Example 4 objective lens.
Figure 5B:
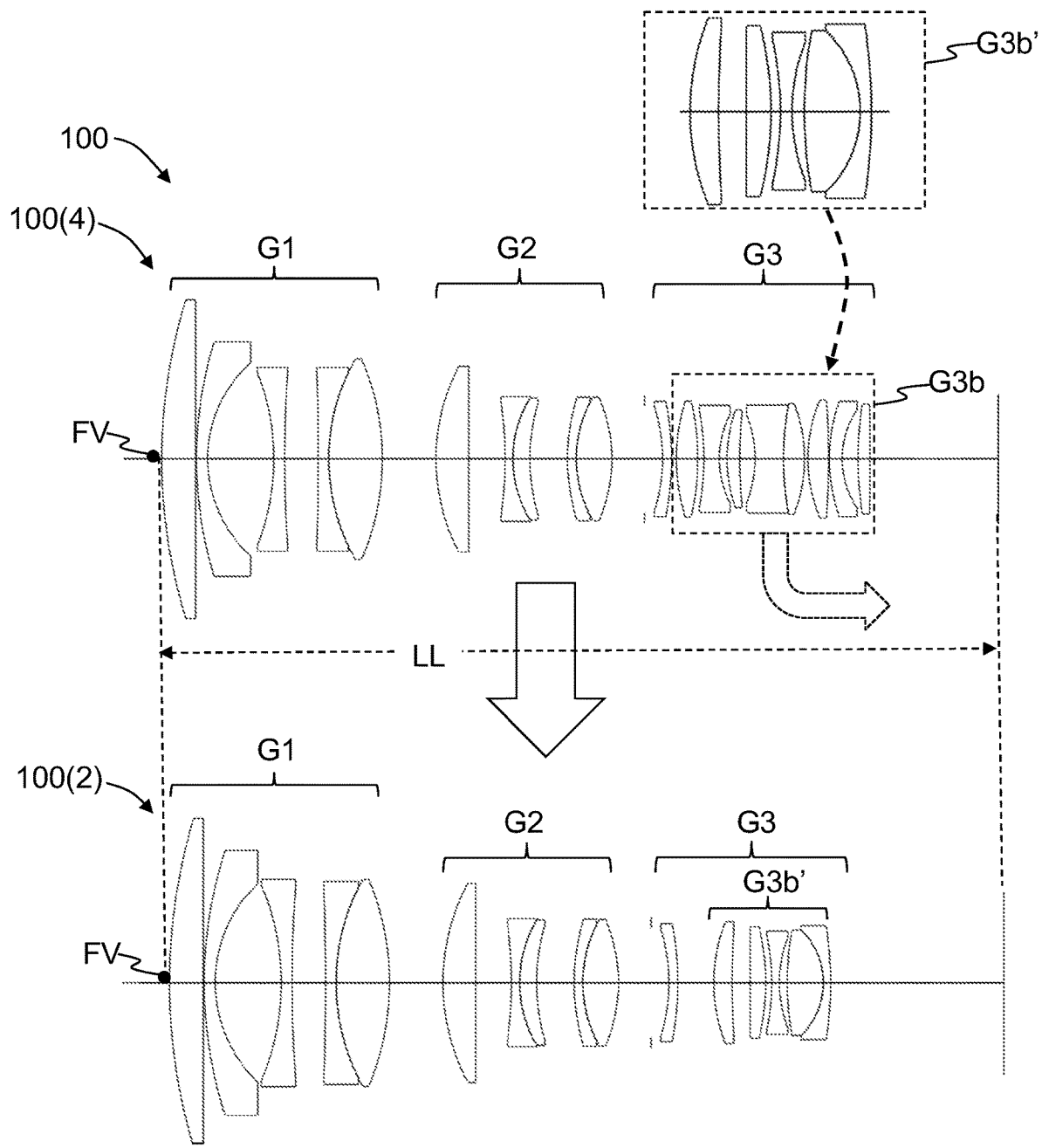
FIG. 5B is an optical diagram showing how the Example 4 lens can be modified by replacing the second lens sub-group G3b of the third lens group G3 to arrive at the Example 2 objective lens.

FIGS. 5A and 5B are optical diagrams illustrating how the second general embodiment of the objective lens 100 can be modified by swapping out the existing second lens sub-group G3b of the third lens group G3 with new second lens sub-group G3b'. In the case of FIG. 5A, the Example 2 objective lens 100(2) is converted to the Example 4 objective lens 100(4) wherein the new second lens sub-group G3b' is that of the Example 4 objective lens. In the case of FIG. 5B, the Example 4 objective lens 100(4) is converted to the Example 2 objective lens 100(2) wherein the new second lens sub-group G3b' is that of the Example 4 objective lens. The swappable lens sub-group G3b in the objective lens 100 is enabled in part by having substantially collimated light rays between lens elements 11 and 12.

The configuration of the objective lens 100 that allows for rear swappable optics (second sub-lens group G3b) provides an easy way to change the design focal lengths and the image size of the objective lens without changing the lens length LL. For the example of FIG. 5B, the design focal lengths change from the Example 4 focal lengths of FL1=28.8 mm, FL2=34.5 mm, FL3=38.7 mm, and FL4=43.3 mm to the Example 2 focal lengths of FL1=36.0 mm, FL2=43.1 mm, FL3=48.3 mm and FL4=54.0 mm. In addition, the image size changes from the Example 4 field size of 18 mm×24 mm (i.e., a diagonal size of 31.1 mm) to the Example 2 field size of 24 mm×36 mm (i.e., a diagonal size of 43.27 mm). The changes occur in the opposite direction in the example of FIG. 5A where the Example 2 objective lens 100(2) is converted to the Example 4 objective lens 100(4).

Set of Objective Lenses

The objective lenses 100 disclosed herein provide consistent high-quality imaging performance substantially the same as that of high-performance prime lenses while also allowing for use at multiple focal lengths. Thus, an aspect of the disclosure is directed to replacing a set of P prime lenses with a set of Q objective lenses 10, where Q<P, so that fewer lenses are needed to cover a given focal length span.

A conventional way to cover a relatively wide focal length span from about 20 mm to 115 mm with a set of prime lenses is to have P=10 different prime lenses with design focal lengths spread out over the focal length span, such as 20 mm, 28 mm, 36 mm, 43 mm, 48 mm, 54 mm, 69 mm, 95 mm, 105 mm and 115 mm. It is noted that each of the prime lenses costs between about $15K and $25K, so that the cost of this set of P=10 prime lenses is about $150K to $250K.

Figure 6:
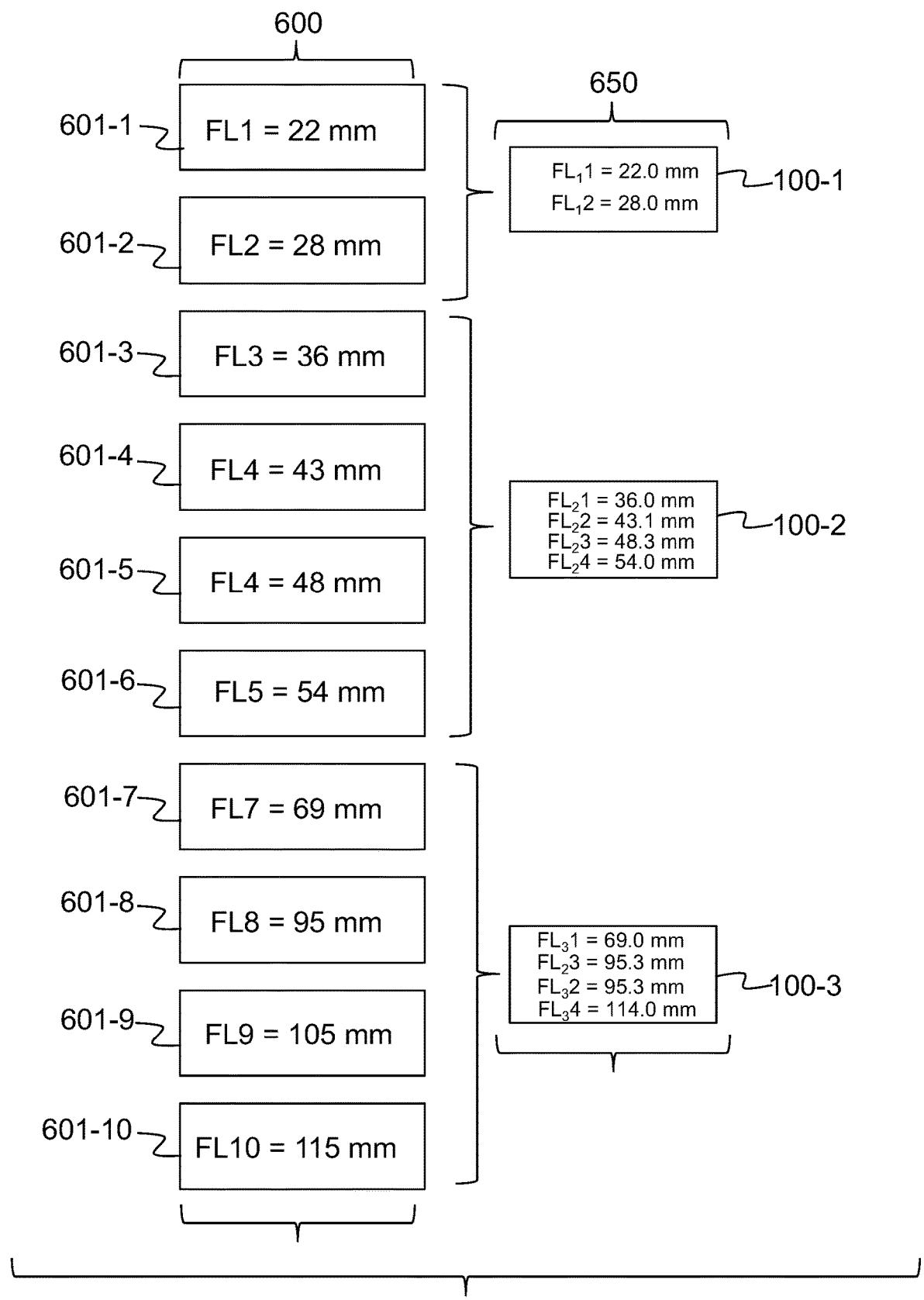
FIG. 6 is a schematic diagram that illustrates how a set of ten (10) prime lenses can be replaced by a set of three (3) objective lenses each designed to have a relatively small focal-length ratio FLR with select design focal lengths, wherein the focal-length ratios FLR of the objective lenses are relatively small and do not overlap.

FIG. 6 is a schematic diagram that illustrates how a set 600 of P=10 prime lenses 601-1 to 601-10 can be replaced by a set 650 of Q=3 objective lenses 100, denoted 100-1, 100-2 and 100-3. The objective lenses 100-1, 100-2 and 100-3 are each designed to have the aforementioned relatively small focal-length ratio FLR with select design focal lengths within respective focal length intervals FLI1, FLI2 and FLI3 that in one example do not overlap, while in another example can partially overlap. The design focal lengths FL of the different objective lenses 100 are generally denoted here as $FL_m n$, where m denotes which lens and n denotes which focal length for the given lens.

For example, the first objective lens 100-1 (m=1) can provide two (i.e., n=2) design focal lengths $FL_1 1$ and $FL_1 2$ of 22.0 mm and 28.0 mm respectively, according to the Example 1 objective lens 100(1) described above. The second objective lens 100-2 (m=2) can provide four (i.e., n=4) design focal lengths $FL_2 1$, $FL_2 2$, $FL_2 3$ and $FL_2 4$ of 36.0 mm, 43.1 mm, 48.3 mm and 54.0 mm respectively, according to the Example 2 objective lens 100(2) described above. The third objective lens 100-3 (m=3) can also provide four (i.e., n=4) design focal lengths of $FL_3 1$, $FL_3 2$, $FL_3 3$ and $FL_3 4$ of 69.0 mm, 95.3 mm, 105.2 mm and 114.0 mm, respectively, according to the Example 3 objective lens 100(3) described above.

In another example, Q=3 objectives lenses 100-1, 100-2 and 100-3 as disclosed herein can be configured to provide a total eight focal lengths provided by P=8 prime lenses 601 as follows: a first objective lens 100-1 provides two (e.g., $FL_1 1$=22 mm and $FL_1 2$=28 mm) wide-angle focal lengths; a second objective lens 100-2 provides three (e.g., $FL_2 1$=36 mm, $FL_2 2$=43 mm and $FL_2 3$=54 mm) medium focal lengths;

and a third objective lens 100-3 provides three (e.g., $FL_31=69$ mm, $FL_32=95$ mm and $FL_33$ 114 mm) narrow-angle (telephoto) focal lengths.

It is estimated that each of the objective lenses 100 can have a cost that is not much more than a given high-performance prime lens 601, e.g., about 1.25× to 1.5× the cost of such a prime lens. Thus, by using say Q=3 or 4 objective lenses 100 to provide the ten focal lengths otherwise provided by the set 600 of P=10 prime lenses 601, the total lens cost for the set of Q objective lenses 100 can be about half of the total prime lens cost for the set 600 of P prime lenses. In some cases, the total lens cost can be reduced by more than half.

In another example, the P=10 prime lenses 601 can be replaced by a set of Q=5 objective lenses 100 each having two design focal lengths. In another example, only a sub-set of the prime lenses 601 are replaced, so that for a set 600 of P=10 prime lenses, some of the prime lenses are kept while others are replace by objective lenses in any combination, so that Q<P.

Thus, for example, it may be that at a minimum two prime lenses 601 in the set 600 of prime lenses are replaced by one objective lens 100 having two design focal lengths, which are the same as or similar to the respective focal lengths of the prime lenses being replaced. Also in an example, at a maximum, all the prime lenses 601 in the set 600 of P prime lenses are replaced by a corresponding set 650 of Q objective lenses 100.

Camera Embodiment

Figure 7:
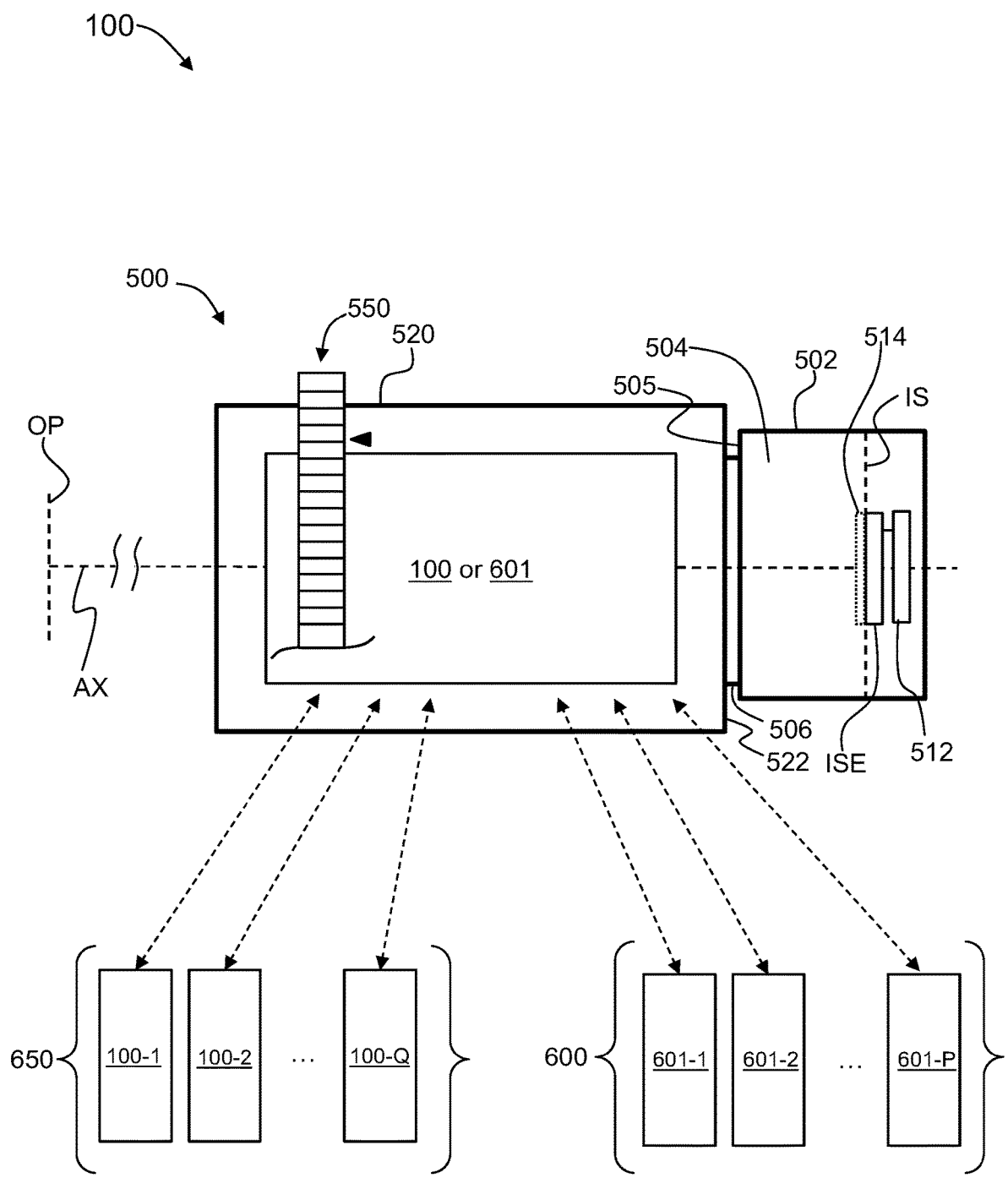
FIG. 7 is a schematic diagram of an example objective lens disclosed herein as part of a camera, and also showing how either a set of objective lenses or a set of prime lenses can be used with the camera.

FIG. 7 is a schematic diagram of the objective lens 100 disclosed herein as part of a camera 500. The camera 500 includes a camera housing 502 having interior 504 and a front side 505. Front side 505 includes a lens mounting fixture 506. The camera 500 operably supports within the interior 504 an image sensor ISE that is electrically connected to camera electronics 512. The camera electronics 512 are configured to receive and process the images captured by the image sensor ISE. The objective lens 100 is operably supported in a lens barrel 520 having a back side 522. The lens barrel 520 is configured to operably support the objective lens 100 and is configured at back side 522 to mount to the camera housing 502 at the lens mounting fixture 506. In an embodiment, the most rearward lens group G3 of the objective lens 100 can partially extend into the camera housing interior 504. The camera 500 can include an optional optical filter 514 arranged adjacent image sensor ISE. In examples, the camera 500 can be a cinemagraphic camera or a high-end video camera.

In an example, the objective lens 100 or 601 has a focus scale 550 for use when changing focus. As noted above, the focus scale 550 has a calibration that remains substantially constant (i.e., the focus scale remains substantially calibrated) when the lens length LL stays substantially the same when one second lens sub-group G3b is swapped for a different rear lens sub-group G3b' (see FIG. 5B). In an example, the focus scale 550 resides on the lens barrel 520 and is mechanically engaged with the second lens sub-group G1b of the first lens group G1 to change focus using focusing mechanisms known in the art.

The MTF performance of the objective lenses 100 disclosed herein is at a level suitable for use with electronic (image) sensors ISE having around 4,000 pixels or more across the field of view. Such electronic image sensors are known by those skilled in the art as 4K image sensors.

FIG. 7 also shows the camera 500 with an example set 650 of Q objective lenses 100, denoted 100-1, 100-2, ... 100-Q, along with a set 600 of P prime lenses 601, denoted 601-1, 601-2, ... 601-P. Either one of the objective lenses 100 or one of the prime lenses 601 can be operably attached to and used with the camera 500, with the advantage that fewer object lenses 100 are required to cover substantially the same focal length span as a set 600 of P prime lenses 601.

An advantage of having a set 650 of objective lenses 100 is that it can serve to reduce the number of times a lens needs to be mounted to and dismounted from the camera housing 502. This can lead to a reduction in image acquisition time and hence faster image capture. Another advantage is that shipping costs can be reduced since fewer lenses of similar weight are employed.

Design Tables

The various Design Tables mentioned above for each of the four Example objective lenses 100(1) through 100(4) are included below. In the Design Tables, the following symbols are used:
GRP=lens group
sGRP=lens sub-group
IH=image height (mm)
IH'=normalized image height (0=on axis, 1=full field)
S=Surface
F=focus distance position
FL=Design focal length
SEP=Separation between adjacent surfaces (mm)
R=Radius of curvature (mm)
TYPE=material of medium, e.g., glass or air
Code=glass code
NAME=glass name
$D_{1/2}$=Aperture half diameter
FFI (%)=Full-field illumination at the given focus distance.
FFD (%)=Full-field distortion at the given focus distance.
B (%)=Percentage of breathing based on the difference between the full-field principle ray angles (in degrees) at infinite focus and close-focus positions at the given focus distance.
R=Radial azimuth
T=Tangential azimuth
MTF=Modulation Transfer Function. The MTF data is polychromatic diffraction MTF data (%) at 25 cycles/mm at the intermediate object-to-image focus distance F2, and at a fixed image position surface and at wavelengths of 587.6 nm, 546.1 nm and 486.1 nm with respective weightings of 8, 9 and 7.

Example 1

TABLE 1A

| ITEM | GRP | sGRP | S | F | FL | SEP | R | TYPE | Code | NAME | $D_{1/2}$ |
|---|---|---|---|---|---|---|---|---|---|---|---|
| OP | | | S0 | F1 | All | 1000004.500 | Flat | | | | |
| | | | | F2 | All | 1616.100 | | | | | |
| | | | | F3 | All | 677.500 | | | | | |
| | | | | F4 | All | 322.500 | | | | | |
| 1 | G1 | G1a | S1 | All | All | 6.415 | 99.816 | Glass | 847238 | STIH53 | 36.69 |
| | | | S2 | All | All | 0.200 | 172.241 | Air | | | 34.61 |
| 2 | G1 | G1a | S3 | All | All | 2.450 | 54.007 | Glass | 883408 | SLAH58 | 27.85 |
| | | | S4 | All | All | 12.680 | 24.644 | Air | | | 21.20 |

TABLE 1A-continued

| ITEM | GRP | sGRP | S | F | FL | SEP | R | TYPE | Code | NAME | $D_{1/2}$ |
|---|---|---|---|---|---|---|---|---|---|---|---|
| 3 | G1 | G1a | S5 | All | All | 2.400 | Flat | Glass | 883408 | SLAH58 | 20.85 |
|  |  |  | S6 | F1 | All | 6.143 | 47.708 | Air |  |  | 19.09 |
|  |  |  |  | F2 | All | 6.771 |  |  |  |  |  |
|  |  |  |  | F3 | All | 7.618 |  |  |  |  |  |
|  |  |  |  | F4 | All | 9.143 |  |  |  |  |  |
| 4 | G1 | G1b | S7 | All | All | 2.550 | 932.280 | Glass | 883408 | SLAH58 | 18.34 |
|  |  |  | S8 | All | All | 3.487 | 77.634 | Air |  |  | 17.98 |
| 5 | G1 | G1b | S9 | All | All | 2.400 | −169.059 | Glass | 847238 | STIH53 | 18.00 |
| 6 | G1 | G1b | S10 | All | All | 7.343 | 31.074 | Glass | 834372 | SLAH60 | 18.81 |
|  |  |  | S11 | All | All | 0.600 | 96.547 | Air |  |  | 19.07 |
| 7 | G1 | G1b | S12 | All | All | 2.450 | 98.682 | Glass | 618634 | SPHM52 | 19.30 |
| 8 | G1 | G1b | S13 | All | All | 12.268 | 42.410 | Glass | 720347 | SNBH8 | 20.05 |
|  |  |  | S14 | F1 | All | 4.550 | −46.645 | Air |  |  | 20.28 |
|  |  |  |  | F2 | All | 3.922 |  |  |  |  |  |
|  |  |  |  | F3 | All | 3.075 |  |  |  |  |  |
|  |  |  |  | F4 | All | 1.550 |  |  |  |  |  |
|  |  |  |  | All | FL1 | 21.220 |  |  |  |  |  |
|  |  |  |  | All | FL2 | 1.350 |  |  |  |  |  |
| 9 | G2 |  | S15 | All | All | 7.074 | −39.171 | Glass | 487702 | SFSL5 | 17.80 |
| 10 | G2 |  | S16 | All | All | 2.500 | −23.045 | Glass | 834372 | SLAH60 | 18.02 |
|  |  |  | S17 | All | All | 0.200 | −29.727 | Air |  |  | 19.16 |
| 11 | G2 |  | S18 | All | All | 11.096 | 69.246 | Glass | 487702 | SFSL5 | 17.44 |
| 12 | G2 |  | S19 | All | All | 2.300 | −30.384 | Glass | 883408 | SLAH58 | 17.23 |
|  |  |  | S20 | All | All | 2.080 | −79.596 | Air |  |  | 17.79 |
| 13 | G2 |  | S21 | All | All | 14.244 | −47.961 | Glass | 835427 | SLAH55 | 17.78 |
|  |  |  | S22 | All | FL1 | 2.350 | −41.959 | Air |  |  | 19.96 |
|  |  |  |  | All | FL2 | 22.220 |  |  |  |  |  |
| Stop | G3 |  | S23 | All | All | 12.757 | Flat | Air |  |  | 16.51 |
| 14 | G3 |  | S24 | All | All | 6.217 | 67.225 | Glass | 847238 | STIH53 | 16.06 |
| 15 | G3 |  | S25 | All | All | 1.900 | −50.620 | Glass | 804396 | SLAH63 | 15.84 |
|  |  |  | S26 | All | All | 0.300 | −1439.595 | Air |  |  | 15.24 |
| 16 | G3 |  | S27 | All | All | 6.892 | 37.614 | Glass | 439950 | SFPL53 | 14.37 |
| 17 | G3 |  | S28 | All | All | 1.800 | −44.604 | Glass | 883408 | SLAH58 | 13.80 |
|  |  |  | S29 | All | All | 13.766 | 29.754 | Air |  |  | 12.83 |
| 18 | G3 |  | S30 | All | All | 7.921 | 56.847 | Glass | 497816 | SFPL51 | 14.96 |
|  |  |  | S31 | All | All | 0.400 | −34.297 | Air |  |  | 15.29 |
| 19 | G3 |  | S32 | All | All | 1.750 | 82.299 | Glass | 847238 | STIH53 | 15.14 |
| 20 | G3 |  | S33 | All | All | 8.957 | 22.019 | Glass | 439950 | SFPL53 | 14.55 |
|  |  |  | S34 | All | All | 40.841 | −341.535 | Air |  |  | 14.95 |
| IS |  |  | S35 | F1 | FL1 | 0.000 | Flat |  |  |  |  |
|  |  |  |  | F2 | FL1 | 0.000 | Flat |  |  |  |  |
|  |  |  |  | F3 | FL1 | 0.000 | Flat |  |  |  |  |
|  |  |  |  | F4 | FL1 | 0.000 | −1414.930 |  |  |  |  |
|  |  |  |  | F1 | FL2 | 0.000 | Flat |  |  |  |  |
|  |  |  |  | F2 | FL2 | 0.000 | Flat |  |  |  |  |
|  |  |  |  | F3 | FL2 | 0.000 | Flat |  |  |  |  |
|  |  |  |  | F4 | FL2 | 0.000 | −1431.491 |  |  |  |  |

TABLE 1B

| Field Positions | | Focal Lengths F1 and F2 | | Performance |
|---|---|---|---|---|
| IH (mm) | IH' | 22.0 mm | 28.0 mm | Description |
| 0 | 0 | 91.1 (R) & (T) | 85.9 (R) & (T) | Polychromatic MFT data (%) |
| 12 | 0.55 | 80.5 (R) 76.0 (T) | 67.0 (R) 52.5 (T) | R = Radial T = Tangential |
| 18 | 0.83 | 75.0 (R) 76.8 (T) | 52.5 (R) 65.0 (T) |  |
| 21.63 | 1 | 57.9 (R) 58.2 (T) | 56.7 (R) 57.9 (T) |  |
| 21.63 | 1 | −2.3 | 1.5 | FFD (%) |
| 21.63 | 1 | 30.9 | 25.6 | DDI (%) |
| 21.63 | 1 | −1.7 | −1.6 | B (%) |

TABLE 1C

Design focal lengths:
FL1 = 22.0 mm
FL2 = 28.0 mm

TABLE 1C-continued

Focal-length ratio FLR = 1.27 Focal length interval
FLI: 22.0 mm to 28.0 mm
f/# = f/2.5
Lens length LL from front vertex to image = 232.5 mm
Close focus to front vertex = 322.5 mm
Close focus, object to image = 555.0 mm = 1' 9.9"
Group focal lengths:
G1:f1 = −49.134 mm (at infinity focus F1)
G1:f1 = −50.166 mm (at close focus F4)
G1a: f1a = −28.070 mm
G1b: f1b = 255.329 mm
G2: f2 = 82.012 mm
G3: f3 = 128.867 mm
Axial travel length LA of G2 = 19.87 mm
Glass weight = 0.63 kg (1.39 lbs)
Projected total lens weight W with metal barrel = 1.58 kg (3.47 lbs)

Example 2

TABLE 2A

| ITEM | GRP | sGRP | S | F | FL | SEP | R | TYPE | Code | NAME | $D_{1/2}$ |
|---|---|---|---|---|---|---|---|---|---|---|---|
| OP |  |  | S0 | F1 | All | 1000004.500 | Flat |  |  |  |  |
|  |  |  |  | F2 | All | 1610.320 |  |  |  |  |  |
|  |  |  |  | F3 | All | 652.500 |  |  |  |  |  |
|  |  |  |  | F4 | All | 322.500 |  | Glass | 847238 | STIH53 | 39.23 |
| 1 | G1 | G1a | S1 | All | All | 8.617 | 141.211 | Air |  |  | 36.31 |
|  |  |  | S2 | All | All | 0.200 | Flat | Glass | 755523 | SYGH51 | 30.78 |
| 2 | G1 | G1a | S3 | All | All | 2.800 | 105.737 | Air |  |  | 24.92 |
|  |  |  | S4 | All | All | 16.928 | 33.846 | Glass | 744448 | SLAM2 | 24.00 |
| 3 | G1 | G1a | S5 | All | All | 2.750 | −61.523 | Air |  |  | 23.68 |
|  |  |  | S6 | F1 | All | 5.388 | 311.813 |  |  |  |  |
|  |  |  |  | F2 | All | 6.733 |  |  |  |  |  |
|  |  |  |  | F3 | All | 8.535 |  |  |  |  |  |
|  |  |  |  | F4 | All | 11.220 |  | Glass | 847238 | STIH53 | 23.64 |
| 4 | G1 | G1b | S7 | All | All | 2.650 | −583.267 | Glass | 729547 | SLAL18 | 23.76 |
| 5 | G1 | G1b | S8 | All | All | 13.577 | 52.760 | Air |  |  | 24.41 |
|  |  |  | S9 | F1 | All | 6.332 | −66.205 |  |  |  |  |
|  |  |  |  | F2 | All | 4.987 |  |  |  |  |  |
|  |  |  |  | F3 | All | 3.186 |  |  |  |  |  |
|  |  |  |  | F4 | All | 0.500 |  |  |  |  |  |
|  |  |  |  | All | FL1 | 16.015 |  |  |  |  |  |
|  |  |  |  | All | FL2 | 10.433 |  |  |  |  |  |
|  |  |  |  | All | FL3 | 6.912 |  |  |  |  |  |
|  |  |  |  | All | FL4 | 3.412 |  |  |  |  |  |
| 6 | G2 | G2a | S10 | All | All | 8.359 | 52.476 | Glass | 883408 | SLAH58 | 23.08 |
|  |  |  | S11 | All | FL1 | 3.576 | Flat | Air |  |  | 22.34 |
|  |  |  |  | All | FL2 | 9.158 |  |  |  |  |  |
|  |  |  |  | All | FL3 | 12.679 |  |  |  |  |  |
|  |  |  |  | All | FL4 | 16.179 |  |  |  |  |  |
| 7 | G2 | G2b | S12 | All | All | 2.100 | −102.276 | Glass | 755523 | SYGH51 | 14.80 |
| 8 | G3 | G3b | S13 | All | All | 4.312 | 30.382 | Glass | 847238 | STIH53 | 14.51 |
|  |  |  | S14 | All | FL1 | 15.139 | 50.501 | Air |  |  | 14.34 |
|  |  |  |  | All | FL2 | 9.557 |  |  |  |  |  |
|  |  |  |  | All | FL3 | 6.036 |  |  |  |  |  |
|  |  |  |  | All | FL4 | 2.536 |  |  |  |  |  |
| 9 | G2 | G2c | S15 | All | All | 2.200 | 53.764 | Glass | 847238 | STIH53 | 14.68 |
| 10 | G2 | G2c | S16 | All | All | 9.030 | 31.847 | Glass | 439950 | SFPL53 | 14.46 |
|  |  |  | S17 | All | FL1 | 2.700 | −40.141 | Air |  |  | 14.66 |
|  |  |  |  | All | FL2 | 8.282 |  |  |  |  |  |
|  |  |  |  | All | FL3 | 11.803 |  |  |  |  |  |
|  |  |  |  | All | FL4 | 15.303 |  |  |  |  |  |
| Stop | G3 | G3a | S18 | All | All | 4.578 | Flat | Air |  |  | 13.59 |
| 11 | G3 | G3a | S19 | All | All | 2.250 | −44.278 | Glass | 516641 | SBSL7 | 13.50 |
|  |  |  | S20 | All | All | 9.128 | −76.666 | Air |  |  | 13.78 |
| 12 | G3 | G3b | S21 | All | All | 4.709 | 40.119 | Glass | 847238 | STIH53 | 14.47 |
|  |  |  | S22 | All | All | 4.537 | 234.826 | Air |  |  | 14.12 |
| 13 | G3 | G3b | S23 | All | All | 4.140 | Flat | Glass | 847238 | STIH53 | 13.22 |
|  |  |  | S24 | All | All | 1.543 | −54.452 | Air |  |  | 12.93 |
| 14 | G3 | G3b | S25 | All | All | 1.900 | −53.471 | Glass | 689311 | STIM28 | 12.09 |
|  |  |  | S26 | All | All | 2.003 | 30.561 | Air |  |  | 11.26 |
| 15 | G3 | G3b | S27 | All | All | 9.189 | 71.265 | Glass | 755523 | SYGH51 | 11.58 |
| 16 | G3 | G3b | S28 | All | All | 1.850 | −18.066 | Glass | 847238 | STIH53 | 12.07 |
|  |  |  | S29 | All | All | 44.000 | −89.469 | Air |  |  | 13.13 |
| IS |  |  | S30 | F1 | FL1 | 0.000 | Flat |  |  |  |  |
|  |  |  |  | F2 | FL1 | 0.000 | Flat |  |  |  |  |
|  |  |  |  | F3 | FL1 | 0.000 | −9926.293 |  |  |  |  |
|  |  |  |  | F4 | FL1 | 0.000 | −1817.796 |  |  |  |  |
|  |  |  |  | F1 | FL2 | 0.000 | Flat |  |  |  |  |
|  |  |  |  | F2 | FL2 | 0.000 | Flat |  |  |  |  |
|  |  |  |  | F3 | FL2 | 0.000 | Flat |  |  |  |  |
|  |  |  |  | F4 | FL2 | 0.000 | −3500.165 |  |  |  |  |
|  |  |  |  | F1 | FL3 | 0.000 | Flat |  |  |  |  |
|  |  |  |  | F2 | FL3 | 0.000 | Flat |  |  |  |  |
|  |  |  |  | F3 | FL3 | 0.000 | −9435.474 |  |  |  |  |
|  |  |  |  | F4 | FL3 | 0.000 | −2430.810 |  |  |  |  |
|  |  |  |  | F1 | FL4 | 0.000 | Flat |  |  |  |  |
|  |  |  |  | F2 | FL4 | 0.000 | Flat |  |  |  |  |
|  |  |  |  | F3 | FL4 | 0.000 | −16384.928 |  |  |  |  |
|  |  |  |  | F4 | FL4 | 0.000 | −4168.603 |  |  |  |  |

TABLE 2B

| Field Positions | | Focal Lengths FL1 to FL4 | | | | Performance |
|---|---|---|---|---|---|---|
| IH (mm) | IH' | 36.0 mm | 43.1 mm | 48.3 mm | 54.0 mm | Description |
| 0 | 0 | 82.4 (R) & (T) | 84.4 (R) & (T) | 81.1 (R) & (T) | 92.7 (R) & (T) | Polychromatic MFT data (%) |
| 12 | 0.55 | 82.5 (R) 63.8 (T) | 66.6 (R) 69.2 (T) | 55.8 (R) 79.6 (T) | 76.5 (R) 78.1 (T) | R = Radial T = Tangential |
| 18 | 0.83 | 89.5 (R) 75.1 (T) | 70.3 (R) 78.2 (T) | 53.3 (R) 79.2 (T) | 59.1 (R) 74.2 (T) | |
| 21.63 | 1 | 84.8 (R) 65.9 (T) | 80.2 (R) 75.6 (T) | 73.9 (R) 69.7 (T) | 66.5 (R) 59.0 (T) | |
| 21.63 | 1 | −2.2 | −0.1 | 1.1 | 2.0 | FFD (%) |
| 21.63 | 1 | 29.0 | 27.4 | 25.5 | 24.1 | FFI (%) |
| 21.63 | 1 | 0.0 | 1.1 | 1.9 | 3.1 | B (%) |

TABLE 2C

Design focal lengths
FL1 = 36.0 mm
FL2 = 43.1 mm
FL3 = 48.3 mm
FL4 = 54.0 mm
Focal-length ratio FLR = 1.50 Focal length interval: 36.0 mm to 54.0 mm
f/# = f/2.5
Lens length LL from front vertex to image = 212.5 mm
Close focus to front vertex = 322.5 mm
Close focus, object to image = 535.0 mm = 1' 9.1"
Group focal lengths:
G1: f1 = −81.616244 (at infinity focus F1)
G1: f1 = −89.472105 (at close focus F4)
G1a: f1a = −41.297 mm
G1b: f1b = 131.278 mm TABLE 2C-continued G2: f2 = 93.331 mm (at short focal length FL1)
G2: f2 = 85.171 mm (at long focal length FL4)
G2a: f2a = 59.085 mm
G2b: f2b = −46.610 mm
G2c: f2c = 73.261 mm
G3: f3 = 96.868 mm
G3a: f3a = −207.155 mm
G3b: f3b = 69.614 mm
Axial travel length LA of GT = G2a + G2c = 24.901 mm
Glass weight = 0.56 kg (1.23 lbs)
Projected total lens weight W with metal = 1.40 kg (3.5 lbs)

Example 3

TABLE 3A

| ITEM | GRP | sGRP | S | F | FL | SEP | R | TYPE | Code | NAME | $D_{1/2}$ |
|---|---|---|---|---|---|---|---|---|---|---|---|
| OP | | | S0 | F1 | All | 1000004.500 | Flat | Air | | | |
| | | | | F2 | All | 1610.320 | | | | | |
| | | | | F3 | All | 937.500 | | | | | |
| | | | | F4 | All | 412.500 | | | | | |
| 1 | G1 | G1a | S1 | All | All | 7.903 | 528.417 | Glass | 847238 | STIH53 | 42.15 |
| | | | S2 | All | All | 0.250 | −291.23 | Air | | | 41.49 |
| 2 | G1 | G1a | S3 | All | All | 3.500 | 175.735 | Glass | 439950 | SFPL53 | 37.27 |
| | | | S4 | All | All | 18.163 | 54.008 | Air | | | 32.49 |
| 3 | G1 | G1a | S5 | All | All | 3.250 | −89.009 | Glass | 835427 | SLAH55 | 32.03 |
| | | | S6 | F1 | All | 1.790 | −12054.009 | Air | | | 32.11 |
| | | | | F2 | All | 8.120 | | | | | |
| | | | | F3 | All | 12.112 | | | | | |
| | | | | F4 | All | 22.118 | | | | | |
| 4 | G1 | G1b | S7 | All | All | 3.350 | 242.565 | Glass | 847238 | STIH53 | 33.23 |
| 5 | G1 | G1b | S8 | All | All | 16.192 | 78.194 | Glass | 583464 | SBAM3 | 32.99 |
| | | | S9 | F1 | All | 20.828 | −104.409 | Air | | | 33.18 |
| | | | | F2 | All | 14.498 | | | | | |
| | | | | F3 | All | 10.505 | | | | | |
| | | | | F4 | All | 0.500 | | | | | |
| | | | | All | FL1 | 28.962 | | | | | |
| | | | | All | FL2 | 12.931 | | | | | |
| | | | | All | FL3 | 8.061 | | | | | |
| | | | | All | FL4 | 4.061 | | | | | |
| 6 | G2 | G2a | S10 | All | All | 10.262 | 69.232 | Glass | 497816 | SFPL51 | 29.00 |
| | | | S11 | All | FL1 | 4.751 | −393.261 | Air | | | 28.73 |
| | | | | All | FL2 | 20.782 | | | | | |
| | | | | All | FL3 | 25.652 | | | | | |
| | | | | All | FL4 | 29.652 | | | | | |
| 7 | G2 | G2b | S12 | All | All | 3.350 | −96.097 | Glass | 788474 | SLAH64 | 25.80 |
| 8 | G2 | G2b | S13 | All | All | 7.341 | 48.511 | Glass | 847238 | STIH53 | 24.90 |
| | | | S14 | All | FL1 | 27.401 | 129.506 | Air | | | 24.66 |
| | | | | All | FL2 | 11.370 | | | | | |
| | | | | All | FL3 | 6.500 | | | | | |
| | | | | All | FL4 | 2.500 | | | | | |

TABLE 3A-continued

| ITEM | GRP | sGRP | S | F | FL | SEP | R | TYPE | Code | NAME | D$_{1/2}$ |
|---|---|---|---|---|---|---|---|---|---|---|---|
| 9 | G2 | G2c | S15 | All | All | 3.350 | 75.300 | Glass | 847238 | STIH53 | 26.00 |
| 10 | G2 | G2c | S16 | All | All | 15.423 | 48.407 | Glass | 497816 | SFPL51 | 25.40 |
|  |  |  | S17 | All | FL1 | 3.190 | −73.277 | Air |  |  | 25.47 |
|  |  |  |  | All | FL2 | 19.221 |  |  |  |  |  |
|  |  |  |  | All | FL3 | 24.091 |  |  |  |  |  |
|  |  |  |  | All | FL4 | 28.091 |  |  |  |  |  |
| 11 | G3 |  | S18 | All | All | 3.550 | −61.976 | Glass | 640601 | SBSM81 | 23.10 |
|  |  |  | S19 | All | All | 2.700 | −79.999 | Air |  |  | 23.11 |
| Stop | G3 |  | S20 | All | All | 2.500 | Flat | Air |  |  | 21.91 |
| 12 | G3 |  | S21 | All | All | 3.450 | 51.993 | Glass | 835427 | SLAH55 | 21.63 |
|  |  |  | S22 | All | All | 1.200 | 44.986 | Air |  |  | 20.78 |
| 13 | G3 |  | S23 | All | All | 6.286 | 45.000 | Glass | 883408 | SLAH58 | 20.80 |
|  |  |  | S24 | All | All | 0.600 | 126.091 | Air |  |  | 20.15 |
| 14 | G3 |  | S25 | All | All | 8.247 | 32.532 | Glass | 497816 | SFPL51 | 18.72 |
|  |  |  | S26 | All | All | 1.179 | 373.783 | Air |  |  | 17.58 |
| 15 | G3 |  | S27 | All | All | 5.407 | 51.224 | Glass | 439950 | SFPL53 | 15.49 |
| 16 | G3 |  | S28 | All | All | 2.400 | −391.388 | Glass | 801350 | SLAM66 | 14.00 |
|  |  |  | S29 | All | All | 8.636 | 20.237 | Air |  |  | 11.52 |
| 17 | G3 |  | S30 | All | All | 3.450 | −54.347 | Glass | 805254 | STIH6 | 10.84 |
|  |  |  | S31 | All | All | 4.422 | −34.890 | Air |  |  | 10.86 |
| 18 | G3 |  | S32 | All | All | 1.950 | −24.810 | Glass | 883408 | SLAH58 | 9.70 |
|  |  |  | S33 | All | All | 0.250 | −131.878 | Air |  |  | 10.75 |
| 19 | G3 |  | S34 | All | All | 5.018 | 80.997 | Glass | 673321 | STIM25 | 11.55 |
|  |  |  | S35 | All | All | 41.000 | −59.079 | Air |  |  | 12.40 |
| IS |  |  | S36 | F1 | FL1 | 0.000 | Flat |  |  |  |  |
|  |  |  |  | F1 | FL1 | 0.000 | Flat |  |  |  |  |
|  |  |  |  | F1 | FL1 | 0.000 | −4732.535 |  |  |  |  |
|  |  |  |  | F1 | FL1 | 0.000 | −1479.719 |  |  |  |  |
|  |  |  |  | F2 | FL2 | 0.000 | Flat |  |  |  |  |
|  |  |  |  | F2 | FL2 | 0.000 | Flat |  |  |  |  |
|  |  |  |  | F2 | FL2 | 0.000 | −30194.184 |  |  |  |  |
|  |  |  |  | F2 | FL2 | 0.000 | −2132.862 |  |  |  |  |
|  |  |  |  | F3 | FL3 | 0.000 | Flat |  |  |  |  |
|  |  |  |  | F3 | FL3 | 0.000 | Flat |  |  |  |  |
|  |  |  |  | F3 | FL3 | 0.000 | −17421.397 |  |  |  |  |
|  |  |  |  | F3 | FL3 | 0.000 | −1794.505 |  |  |  |  |
|  |  |  |  | F4 | FL4 | 0.000 | Flat |  |  |  |  |
|  |  |  |  | F4 | FL4 | 0.000 | Flat |  |  |  |  |
|  |  |  |  | F4 | FL4 | 0.000 | −3267.824 |  |  |  |  |
|  |  |  |  | F4 | FL4 | 0.000 | −990.654 |  |  |  |  |

TABLE 3B

| Field Positions | | Focal Lengths FL1 to FL4 | | | | Performance |
|---|---|---|---|---|---|---|
| IH (mm) | IH' | 69.0 mm | 95.3 mm | 105.2 mm | 114.0 mm | Description |
| 0 | 0 | 89.7 | 85.1 | 94.6 | 92.1 | Polychromatic |
|  |  | (R) & (T) | (R) & (T) | (R) & (T) | (R) & (T) | MFT data (%) |
| 12 | 0.55 | 71.2 (R) | 71.9 (R) | 84.5 (R) | 82.9 (R) | R = Radial |
|  |  | 85.6 (T) | 87.0 (T) | 88.2 (T) | 87.3 (T) | T = Tangential |
| 18 | 0.83 | 77.8 (R) | 83.9 (R) | 83.2 (R) | 67.8 (R) |  |
|  |  | 79.6 (T) | 66.6 (T) | 79.4 (T) | 81.2 (T) |  |
| 21.63 | 1 | 85.5 (R) | 85.7 (R) | 87.7 (R) | 77.4 (R) |  |
|  |  | 72.8 (T) | 58.7 (T) | 72.0 (T) | 76.9 (T) |  |
| 21.63 | 1 | −0.3 | 0.8 | 1.1 | 1.3 | FFI (%) |
| 21.63 | 1 | 33.8 | 27.2 | 21.9 | 18.2 | FFI (%) |
| 21.63 | 1 | −0.9 | 2.9 | 4.8 | 6.3 | B (%) |

TABLE 3C

Design focal lengths:
FL1 = 69.0 mm
FL2 = 95.3 mm
FL3 = 105.2 mm
FL4 = 114.0 mm
Focal-length ratio FLR = 1.65 Focal length interval
FLI: 69 mm to 114 mm
f/# = f/2.5
Lens length LL from front vertex to image = 281.5 mm Close focus to front vertex = 412.5 mm
Close focus, object to image = 555.0 mm = 2' 3.3"
Macro magnification at long focal length = 1:4.5
Group focal lengths:
G1:f1 = −266.761 mm (at infinity focus F1)
G1:f1 = −388.729 mm (at close focus F4)
G1a: f1a = −97.985 mm
G1b: f1b = 176.381 mm TABLE 3C-continued G2: f2 = 143.101 mm (at short focal length FL1)
G2: f2 = 158.761 mm (at long focal length FL4)
G2a: f2a = 118.989 mm
G2b: f2b = −72.433 mm
G2c: f2c = 95.122 mm
G3: f3 = 302.520 mm TABLE 3C-continued Axial travel distance LA of GT = G2a + G2c = 24.901 mm
Glass weight = 1.03 kg (2.27 lbs)
Projected total lens weight W with metal = 2.58 kg (5.67 lbs)

Example 4

TABLE 4A

| ITEM | GRP | sGRP | S | F | FL | SEP | R | TYPE | CODE | NAME | $D_{1/2}$ |
|---|---|---|---|---|---|---|---|---|---|---|---|
| OP | | | S0 | F1 | All | 1000004.500 | Flat | | | | |
| | | | | F2 | All | 1610.300 | | | | | |
| | | | | F3 | All | 652.500 | | | | | |
| | | | | F4 | All | 322.500 | | | | | |
| 1 | G1 | G1a | S1 | All | All | 8.617 | 141.211 | Glass | 847238 | STIH53 | 34.44 |
| | | | S2 | All | All | 0.200 | Flat | Air | | | 32.68 |
| 2 | G1 | G1a | S3 | All | All | 2.800 | 105.737 | Glass | 755523 | SYGH51 | 28.66 |
| | | | S4 | All | All | 16.928 | 33.846 | Air | | | 24.92 |
| 3 | G1 | G1a | S5 | All | All | 2.750 | −61.523 | Glass | 744448 | SLAM2 | 22.32 |
| | | | S6 | F1 | All | 5.388 | 311.813 | Air | | | 22.12 |
| | | | | F2 | All | 6.733 | | | | | |
| | | | | F3 | All | 8.535 | | | | | |
| | | | | F4 | All | 11.220 | | | | | |
| 4 | G1 | G1b | S7 | All | All | 2.650 | −583.267 | Glass | 847238 | STIH53 | 22.15 |
| 5 | G1 | G1b | S8 | All | All | 13.577 | 52.760 | Glass | 729547 | SLAL18 | 22.33 |
| | | | S9 | F1 | All | 6.332 | −66.205 | Air | | | 24.41 |
| | | | | F2 | All | 4.987 | | | | | |
| | | | | F3 | All | 3.186 | | | | | |
| | | | | F4 | All | 0.500 | | | | | |
| | | | | All | FL1 | 16.015 | | | | | |
| | | | | All | FL2 | 10.433 | | | | | |
| | | | | All | FL3 | 6.912 | | | | | |
| | | | | All | FL4 | 3.412 | | | | | |
| 6 | G2 | G2a | S10 | All | All | 8.359 | 52.476 | Glass | 883408 | SLAH58 | 22.55 |
| | | | S11 | All | FL1 | 3.576 | Flat | Air | | | 21.80 |
| | | | | All | FL2 | 9.158 | | | | | |
| | | | | All | FL3 | 12.679 | | | | | |
| | | | | All | FL4 | 16.179 | | | | | |
| 7 | G2 | G2b | S12 | All | All | 2.100 | −102.276 | Glass | 755523 | SYGH51 | 14.80 |
| 8 | G2 | G2b | S13 | All | All | 4.312 | 30.382 | Glass | 847238 | STIH53 | 14.52 |
| | | | S14 | All | FL1 | 15.139 | 50.501 | Air | | | 14.34 |
| | | | | All | FL2 | 9.557 | | | | | |
| | | | | All | FL3 | 6.036 | | | | | |
| | | | | All | FL4 | 2.536 | | | | | |
| 9 | G2 | G2c | S15 | All | All | 2.200 | 53.764 | Glass | 847238 | STIH53 | 14.68 |
| 10 | G2 | G2c | S16 | All | All | 9.030 | 31.847 | Glass | 439950 | SFPL53 | 14.46 |
| | | | S17 | All | FL1 | 2.700 | −40.141 | Air | | | 14.66 |
| | | | | All | FL2 | 8.282 | | | | | |
| | | | | All | FL3 | 11.803 | | | | | |
| | | | | All | FL4 | 15.303 | | | | | |
| Stop | G3 | G3a | S18 | All | All | 4.578 | Flat | Air | | | 13.60 |
| 11 | G3 | G3a | S19 | All | All | 2.250 | −44.278 | Glass | 516641 | SBSL7 | 13.50 |
| | | | S20 | All | All | 1.250 | −76.666 | Air | | | 13.77 |
| 12 | G3 | G3b² | S21 | All | All | 5.430 | 50.197 | Glass | 847238 | STIH53 | 13.94 |
| | | | S22 | All | All | 1.531 | −66.689 | Air | | | 13.72 |
| 13 | G3 | G3b² | S23 | All | All | 3.931 | −67.939 | Glass | 673321 | STIM25 | 12.97 |
| | | | S24 | All | All | 1.942 | 25.576 | Air | | | 11.76 |
| 14 | G3 | G3b² | S25 | All | All | 3.242 | 37.662 | Glass | 847238 | STIH53 | 11.86 |
| | | | S26 | All | All | 3.863 | 133.595 | Air | | | 11.68 |
| 15 | G3 | G3b² | S27 | All | All | 7.366 | −30.985 | Glass | 847238 | STIH53 | 11.57 |
| 16 | G3 | G3b² | S28 | All | All | 5.322 | 78.787 | Glass | 755523 | SYGH51 | 12.99 |
| | | | S29 | All | All | 0.846 | −39.727 | Air | | | 13.29 |
| 17 | G3 | G3b² | S30 | All | All | 5.235 | 39.345 | Glass | 744448 | SLAM2 | 14.01 |
| | | | S31 | All | All | 0.200 | −209.491 | Air | | | 13.95 |
| 18 | G3 | G3b² | S32 | All | All | 3.259 | 44.479 | Glass | 847238 | STIH53 | 13.66 |
| | | | S33 | All | All | 4.001 | 23.163 | Air | | | 12.68 |
| 19 | G3 | G3b² | S34 | All | All | 3.083 | 89.479 | Glass | 618634 | SPHM52 | 12.89 |
| | | | S35 | All | All | 32.500 | −775.000 | Air | | | 13.00 |
| IS | | | S36 | F1 | FL1 | 0.000 | Flat | | | | |
| | | | | F2 | FL1 | 0.000 | Flat | | | | |
| | | | | F3 | FL1 | 0.000 | −4413.612 | | | | |
| | | | | F4 | FL1 | 0.000 | −1310.204 | | | | |
| | | | | F1 | FL2 | 0.000 | Flat | | | | |
| | | | | F2 | FL2 | 0.000 | Flat | | | | |
| | | | | F3 | FL2 | 0.000 | −10384.991 | | | | |
| | | | | F4 | FL2 | 0.000 | −2495.191 | | | | |

TABLE 4A-continued

| ITEM | GRP | sGRP | S | F | FL | SEP | R | TYPE | CODE | NAME | $D_{1/2}$ |
|---|---|---|---|---|---|---|---|---|---|---|---|
| | | | | F1 | FL3 | 0.000 | Flat | | | | |
| | | | | F2 | FL3 | 0.000 | Flat | | | | |
| | | | | F3 | FL3 | 0.000 | −3252.313 | | | | |
| | | | | F4 | FL3 | 0.000 | −1671.896 | | | | |
| | | | | F1 | FL4 | 0.000 | Flat | | | | |
| | | | | F2 | FL4 | 0.000 | Flat | | | | |
| | | | | F3 | FL4 | 0.000 | −2276.450 | | | | |
| | | | | F4 | FL4 | 0.000 | −2107.218 | | | | |

TABLE 4B

| Field Positions | | Focal Lengths FL1 to FL4 | | | | Performance |
|---|---|---|---|---|---|---|
| IH (mm) | IH' | 28.8 mm | 34.5 mm | 38.7 mm | 43.3 mm | Description |
| 0 | 0 | 84.9 | 88.2 | 85.8 | 94.3 | Polychromatic |
| | | (R) & (T) | (R) & (T) | (R) & (T) | (R) & (T) | MFT data (%) |
| 9 | 0.58 | 73.3 (R) | 68.0 (R) | 59.0 (R) | 79.5 (R) | R = Radial |
| | | 73.9 (T) | 85.3 (T) | 88.2 (T) | 90.7 (T) | T = Tangential |
| 12 | 0.77 | 78.0 (R) | 68.4 (R) | 56.0 (R) | 68.8 (R) | |
| | | 77.3 (T) | 82.0 (T) | 86.2 (T) | 86.8 (T) | |
| 15.55 | 1 | 93.0 (R) | 82.5 (R) | 72.1 (R) | 70.2 (R) | |
| | | 76.9 (T) | 77.5 (T) | 77.0 (T) | 77.0 (T) | |
| 15.55 | 1 | −2.1 | −0.2 | 0.7 | 1.6 | FFD (%) |
| 15.55 | 1 | 32.5 | 30.1 | 28.2 | 26.8 | FFI (%) |
| 15.55 | 1 | 0.1 | 1.1 | 2.0 | 3.0 | B (%) |

TABLE 4C

Design focal lengths:
FL1 = 28.8 mm
FL2 = 34.5 mm
FL3 = 38.7 mm
FL4 = 43.3 mm
Focal-length ratio FLR = 1.50 Focal length interval
FLI: 28.8 mm to 43.3 mm
f/# = f/2.0
Lens length LL from front vertex to image = 212.5 mm
Close focus to front vertex = 322.5 mm
Close focus, object to image = 535.0 mm = 1' 9.1"
Group focal lengths:
G1:f1 = −81.616 (at infinity focus Fl)
G1:f1 = −89.472 (at close focus F4)
G1a: f1a = −41.297 mm
G1b: f1b = 131.278 mm
G2: f2 = 93.331 mm (at short focal length FL1)
G2: f2 = 85.171 mm (at long focal length FL4)
G2a: f2a = 59.085 mm
G2b: f2b = −46.610 mm
G2c: f2c = 73.261 mm
G3: f3 = 64.318 mm
G3a: f3a = −207.155 mm
G3b: f3b = 54.738 mm
Axial travel distance LA of GT = G2a + G2c = 12.603 mm
Glass weight = 0.55 kg (1.21 lbs)

Although the present invention has been fully described in connection with embodiments thereof with reference to the accompanying drawings and tables, it is to be noted that various changes and modifications can be made including smaller and larger focal lengths, smaller and larger image sizes, smaller and larger wavebands (e.g., 455 nm to 643 nm), smaller and larger apertures, etc. as will be apparent to those skilled in the art. Such changes and modifications are to be understood as being included within the scope of the present invention as defined by the appended claims.

What is claimed is:

1. An objective lens comprising along an optical axis and in order from an object space defining a frontward direction to an image space defining a rearward direction and having an image surface:
a first lens group having overall negative (−) power and having a frontward first lens sub-group with overall negative (−) power and that is stationary, and a rearward second lens sub-group with overall positive (+) power and that is axially movable for focusing;
a second lens group having overall positive (+) power;
a third lens group having overall positive (+) power;
an aperture stop residing either between the second and third lens groups or within the third lens group;
between two and four design focal lengths that include a minimum design focal length $FL_{MIN}$ and a maximum design focal length $FL_{MAX}$ that define a focal-length ratio $FLR=FL_{MAX}/FL_{MIN}$, wherein $1.05<FLR\leq2.75$;
wherein the second lens group has one or more axially and in-tandem movable lens elements to change between the design focal lengths and that define a travel-to-focal-length (TFL) ratio R in the range $0.05<R<0.4$; and
wherein the aperture stop defines an F/#, and wherein the F/# at the image is substantially constant at each of the design focal lengths and over a focus range.

2. The objective lens according to claim 1, wherein each design focal length produces an image of a substantially constant image size at the image surface at a substantially constant focus, and with amount of breathing B (%) in a range $-7.5\%\leq B\leq+15.0\%$.

3. The objective lens according to claim 1, wherein the focal-length ratio is in the range $1.1\leq FLR\leq2.75$.

4. The objective lens according to claim 1, wherein:
a) the first lens group includes a most frontward lens element having a front surface vertex, wherein a lens length LL is defined as a distance between the front surface vertex and the image surface, and wherein the lens length LL is constant during focusing; and b) wherein the lens lengths LL is the same at each of the design focal lengths.

5. The objective lens according to claim 4, further comprising a focus scale having a calibration, and wherein the third lens group comprises a front lens sub-group and a rear lens sub-group, and wherein the rear lens sub-group is swappable for a different rear lens sub-group that changes the design focal lengths without changing the lens length LL and the calibration of the focus scale.

6. The objective lens according to claim 1, having only first and second design focal lengths and wherein the second lens group G2 is axially movable as a whole to change between the first and the second design focal lengths.

7. A set of objective lenses, comprising:
a plurality of objective lenses each according to claim 1, with each objective lens having a focal length interval, and wherein the focal length intervals of the plurality of the objective lenses are different from each other.

8. A camera system, comprising:
an objective lens according to claim 1;
a lens barrel having a back end, the lens barrel operably supporting the objective lens;
a camera housing having an interior and a front end that supports a lens mounting fixture to which the back end of the lens barrel attaches;
an image sensor operably disposed within the camera housing interior and at the image surface of the zoom lens when the lens barrel is attached to the camera housing; and
camera electronics electrically connected to the image sensor.

9. A camera system, comprising:
a set of objective lenses comprising a plurality of objective lenses each according to claim 1 and having respective focal length intervals that are different from one another;
a camera housing having an interior and a front end that supports a lens mounting fixture to which one of the objective lenses in the set of objective lenses operably attaches;
an image sensor operably disposed within the camera housing interior and disposed at an image surface common to each of the objective lenses in the set of objective lenses;
camera electronics electrically connected to the image sensor; and
wherein each of the objective lenses provides imaging at the design focal lengths within its focal length interval when operably attached to the camera housing at the lens mounting fixture.

* * * * *